United States Patent
Yamamura et al.

(10) Patent No.: US 11,214,951 B2
(45) Date of Patent: Jan. 4, 2022

(54) SANITARY WASHING DEVICE

(71) Applicant: TOTO LTD., Kitakyushu (JP)

(72) Inventors: Saki Yamamura, Kitakyushu (JP);
Takeshi Yamakawa, Kitakyushu (JP);
Masayuki Mochita, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 0 days.

(21) Appl. No.: 16/903,773

(22) Filed: Jun. 17, 2020

(65) Prior Publication Data
US 2021/0002884 A1    Jan. 7, 2021

(30) Foreign Application Priority Data

Jul. 5, 2019   (JP) .............................. JP2019-126039

(51) Int. Cl.
     *E03D 9/08*      (2006.01)
     *B01D 35/02*      (2006.01)
     *F24H 1/10*      (2006.01)

(52) U.S. Cl.
     CPC .............. *E03D 9/08* (2013.01); *B01D 35/02* (2013.01); *F24H 1/10* (2013.01)

(58) Field of Classification Search
     CPC ........................................................ E03D 9/08
     USPC .............................................. 4/420.2, 420.4
     See application file for complete search history.

(56) References Cited

U.S. PATENT DOCUMENTS

| | | |
|---|---|---|
| 2017/0275865 A1 | 9/2017 | Hashimoto et al. |
| 2018/0058054 A1 | 3/2018 | Yoshida et al. |
| 2018/0347169 A1 | 12/2018 | Tsujita et al. |

FOREIGN PATENT DOCUMENTS

| | | |
|---|---|---|
| CN | 105531427 A | 4/2016 |
| CN | 206376339 U | 8/2017 |
| EP | 3045597 A1 | 7/2016 |
| EP | 3101185 A1 | 12/2016 |
| JP | 2002-294801 A | 10/2002 |
| JP | 2002-294836 A | 10/2002 |
| JP | 2003-139403 A | 5/2003 |
| JP | 2018-204297 A | 12/2018 |
| KR | 10-2018-0022545 A | 3/2018 |
| TW | 201736682 A | 10/2017 |

*Primary Examiner* — Lori L Baker
(74) *Attorney, Agent, or Firm* — Pearne & Gordon LLP

(57) ABSTRACT

A sanitary washing device includes a nozzle, a valve unit, a casing, and a toilet seat. The nozzle is configured to discharge water toward an ano-genital region of a human body. The valve unit is provided on a pipe line between a water supply source and the nozzle. The valve unit includes an electromagnetic valve. The casing stores the nozzle and the valve unit. The toilet seat is pivotally supported to be rotatable with respect to the casing. A heater is provided inside the toilet seat. At least a portion of the valve unit is disposed below the toilet seat.

18 Claims, 16 Drawing Sheets

SANITARY WASHING DEVICE

CROSS-REFERENCE TO RELATED APPLICATIONS

This application is based upon and claims the benefit of priority from Japanese Patent Application No. 2019-126039, filed on Jul. 5, 2019; the entire contents of which are incorporated herein by reference.

FIELD

Embodiments described herein relate generally to a sanitary washing device.

BACKGROUND

In a sanitary washing device, it is known to provide a valve unit including an electromagnetic valve or the like on a pipe line for supplying water from a water supply source to a nozzle. Since the valve unit is supplied with water at a primary pressure from the water supply source, high strength is required. Therefore, the valve unit is generally made of a hard material.

However, when the valve unit is made of a hard material, there is a problem that when the water in the valve unit freezes and expands, the valve unit cannot be deformed according to the expansion of the water and is easily damaged.

SUMMARY

According to the embodiment, a sanitary washing device includes a nozzle, a valve unit, a casing, and a toilet seat. The nozzle is configured to discharge water toward an ano-genital region of a human body. The valve unit is provided on a pipe line between a water supply source and the nozzle. The valve unit includes an electromagnetic valve. The casing stores the nozzle and the valve unit. The toilet seat is pivotally supported to be rotatable with respect to the casing. A heater is provided inside the toilet seat. At least a portion of the valve unit is disposed below the toilet seat.

DETAILED DESCRIPTION

Figure 1:
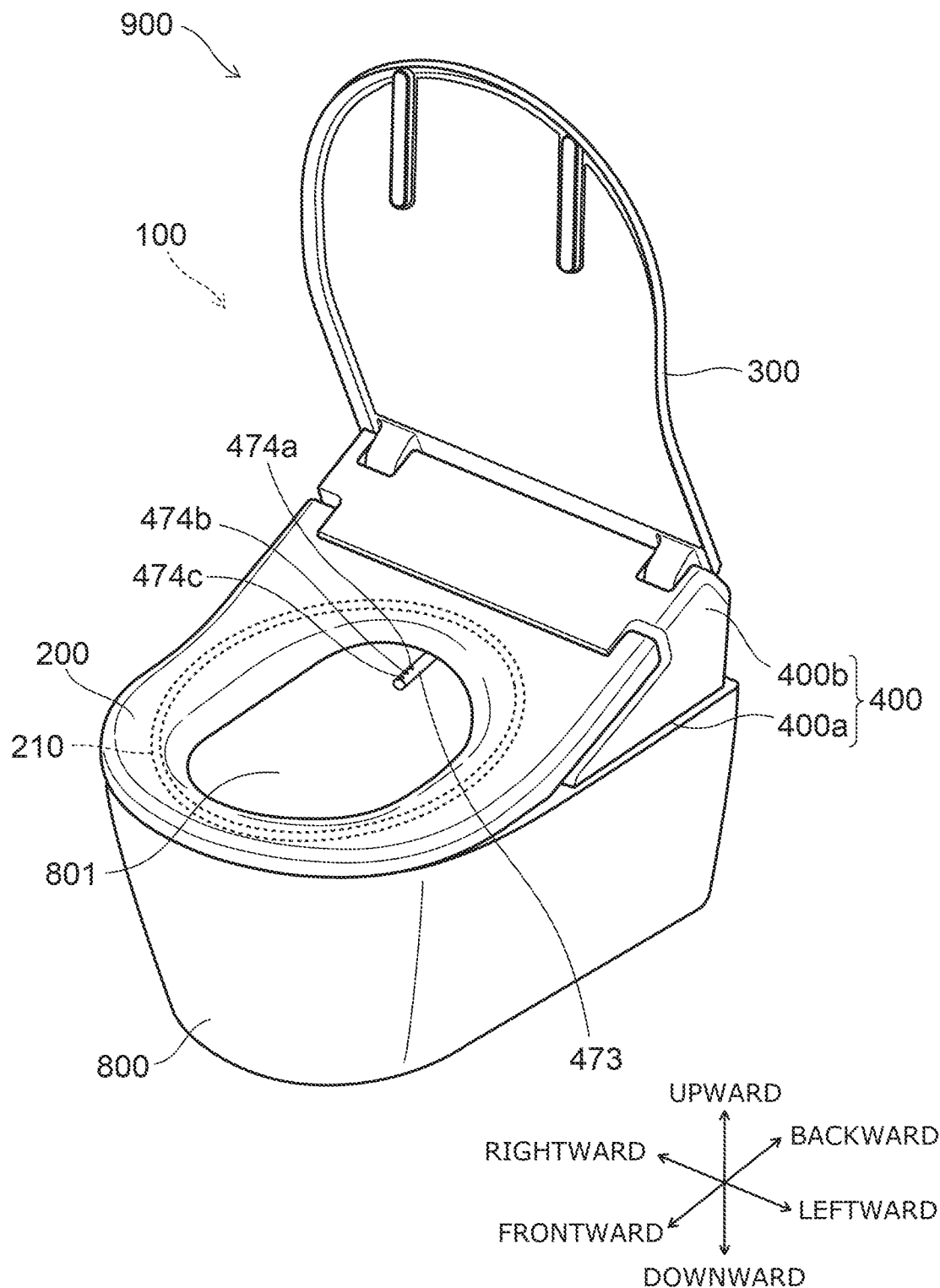
FIG. 1 is a perspective view schematically illustrating a toilet device including a sanitary washing device according to an embodiment.

A first invention is a sanitary washing device that includes a nozzle configured to discharge water toward an ano-genital region of a human body; a valve unit provided on a pipe line between a water supply source and the nozzle, the valve unit including an electromagnetic valve; a casing storing the nozzle and the valve unit; and a toilet seat pivotally supported to be rotatable with respect to the casing, a heater being provided inside the toilet seat, at least a portion of the valve unit being disposed below the toilet seat.

According to the sanitary washing device, at least a portion of the valve unit is disposed below the toilet seat including the heater inside the toilet seat; thereby, freezing of the valve unit can be suppressed by the heat from the heater. Damage of the valve unit due to freezing can be suppressed thereby. In particular, the damage of the valve unit due to freezing can be suppressed even when the valve unit includes a hard material to increase the strength of the valve unit.

A second invention is the sanitary washing device of the first invention, wherein a length in a longitudinal direction of the valve unit and a length in a lateral direction of the valve unit are greater than a length in a vertical direction of the valve unit.

According to the sanitary washing device, by setting the length in the longitudinal direction of the valve unit and the length in the lateral direction of the valve unit to be greater than the length in the vertical direction of the valve unit, the surface area of the valve unit opposing the toilet seat can be increased. Thereby, the heat from the toilet seat can be transmitted to the valve unit more efficiently, and the damage of the valve unit due to freezing can be suppressed more reliably.

A third invention is the sanitary washing device of the first or second invention, wherein the valve unit is disposed below a back portion of the toilet seat, and a length in a longitudinal direction of the valve unit is less than a length in a lateral direction of the valve unit.

According to the sanitary washing device, by setting the length in the longitudinal direction of the valve unit to be less than the length in the lateral direction of the valve unit, even when the valve unit is disposed below the back portion of the toilet seat, a wider range of the valve unit can be disposed below the toilet seat. Thereby, the heat from the toilet seat can be transmitted to the valve unit more efficiently, and the damage of the valve unit due to freezing can be suppressed more reliably.

A fourth invention is the sanitary washing device of any one of the first to third inventions, wherein 20% or more of the valve unit is positioned below the toilet seat.

According to the sanitary washing device, because 20% or more of the valve unit is positioned below the toilet seat, the heat from the toilet seat can be transmitted to the valve unit more efficiently. Thereby, the damage of the valve unit due to freezing can be suppressed more reliably.

A fifth invention is the sanitary washing device of any one of the first to fourth inventions that further includes a heat exchanger unit provided downstream of the valve unit on the pipe line, the heat exchanger unit being configured to heat water supplied from the water supply source, the heat exchanger unit being disposed backward of a back end of the heater of the toilet seat.

According to the sanitary washing device, because the heat exchanger unit does not freeze easily, by disposing the heat exchanger unit further backward than the back end of the heater of the toilet seat, it is easy to ensure space for disposing the valve unit below the toilet seat. Thereby, the space below the toilet seat can be effectively used, and the casing can be more compact.

A sixth invention is the sanitary washing device of any one of the first to fifth inventions, wherein the casing includes a low portion and a high portion, the low portion being positioned below the toilet seat, the high portion being positioned backward of the low portion, a length in a vertical direction of the high portion being greater than a length in a vertical direction of the low portion, the valve unit is disposed in the low portion, an upper surface of the low portion becomes lower from a back toward a front, an upper end of the valve unit becomes lower from a back toward a front, and the toilet seat is provided along the upper surface of the low portion in a longitudinal direction.

According to the sanitary washing device, by setting the upper end of the valve unit to become lower from the back toward the front to conform to the upper surface of the low portion in the longitudinal direction, and by providing the toilet seat along the upper surface of the low portion, the heat from the toilet seat can be transmitted to the valve unit more efficiently. Thereby, the damage of the valve unit due to freezing can be suppressed more reliably.

A seventh invention is the sanitary washing device of the sixth invention, wherein the upper surface of the low portion becomes lower from a lateral-direction center toward a side, the upper end of the valve unit becomes lower from a lateral-direction center toward a side, and the toilet seat is provided along the upper surface of the low portion in a lateral direction.

According to the sanitary washing device, by setting the upper end of the valve unit to become lower from the lateral-direction center toward the side to conform to the upper surface of the low portion in the lateral direction, and by providing the toilet seat along the upper surface of the low portion, the heat from the toilet seat can be transmitted to the valve unit more efficiently. Thereby, the damage of the valve unit due to freezing can be suppressed more reliably.

An eighth invention is the sanitary washing device of any one of the first to seventh inventions, wherein the valve unit further includes a strainer provided upstream of the electromagnetic valve and a reduced-diameter part positioned between the strainer and the electromagnetic valve, an inner diameter of the reduced-diameter part is less than an inner diameter of the strainer, and the reduced-diameter part is disposed below the toilet seat.

According to the sanitary washing device, freezing of the reduced-diameter part can be suppressed by disposing the reduced-diameter part below the toilet seat. Clogging of the reduced-diameter part due to freezing can be suppressed thereby.

A ninth invention is the sanitary washing device of the eighth invention, wherein the strainer is disposed below the toilet seat.

According to the sanitary washing device, damage of the strainer due to freezing can be suppressed by disposing the strainer below the toilet seat. Thereby, the damage of the valve unit due to freezing can be suppressed more reliably.

A tenth invention is the sanitary washing device of any one of the first to ninth inventions, wherein the electromagnetic valve is disposed below the toilet seat.

According to the sanitary washing device, damage of the electromagnetic valve due to freezing can be suppressed by disposing the electromagnetic valve below the toilet seat. Thereby, the damage of the valve unit due to freezing can be suppressed more reliably.

Embodiments of the invention will now be described with reference to the drawings. Similar components in the drawings are marked with the same reference numerals, and a detailed description is omitted as appropriate.

FIG. 1 is a perspective view schematically illustrating a toilet device including a sanitary washing device according to an embodiment.

As illustrated in FIG. 1, the toilet device 900 includes a sit-down flush toilet (a toilet) 800 and the sanitary washing device 100 mounted on the sit-down flush toilet 800. The sanitary washing device 100 includes a casing 400, a toilet seat 200, and a toilet lid 300. The toilet seat 200 and the toilet lid 300 each are pivotally supported to be openable and closable with respect to the casing 400. The casing 400 includes a case plate 400*a* positioned at a lower portion, includes a case cover 400*b* positioned at an upper portion, and stores functional units such as a nozzle 473, etc., in an internal space. A heater 210 for warming the toilet seat 200 is provided inside the toilet seat 200.

Although "upward", "downward", "frontward", "backward", "rightward", and "leftward" are used in the description of the embodiments described below, these directions are directions when viewed by a user sitting on the toilet seat 200 as illustrated in FIG. 1.

An ano-genital region wash functional unit that realizes the washing of an ano-genital region such as a "bottom" or the like of the user sitting on the toilet seat 200, etc., are included inside the casing 400. The ano-genital region wash functional unit includes, for example, the nozzle 473. A seating detection sensor 404 (referring to FIG. 2) that detects the user seated on the toilet seat 200 also is provided in the sanitary washing device 100. When the seating detection sensor 404 detects the user sitting on the toilet seat 200, the nozzle 473 can be advanced into a bowl 801 of the toilet 800 and retracted from the interior of the bowl 801 when the user operates, for example, an operation part 500 such as a remote control, etc. (referring to FIG. 2). A state in which the nozzle 473 is advanced into the bowl 801 is illustrated in the sanitary washing device 100 illustrated in FIG. 1.

The nozzle 473 washes the ano-genital region of a human body by discharging water (wash water) toward the ano-genital region of a human body. A bottom wash water discharge port 474a, a gentle wash water discharge port 474b, and a bidet wash water discharge port 474c are provided in the tip portion of the nozzle 473. The nozzle 473 can wash the "bottom" of the user sitting on the toilet seat 200 by squirting water from the bottom wash water discharge port 474a or the gentle wash water discharge port 474b provided in the tip of the nozzle 473. Or, the nozzle 473 can wash a female ano-genital region of a female sitting on the toilet seat 200 by squirting water from the bidet wash water discharge port 474c provided in the tip of the nozzle 473. In this specification, "water" includes not only cold water but also warm water that is heated.

The modes of washing the "bottom" include, for example, a "bottom wash" and a "gentle wash" that gently washes using a softer water stream than the "bottom wash". For example, the nozzle 473 can perform the "bottom wash", the "gentle wash", and the "bidet wash".

In the nozzle 473 illustrated in FIG. 1, the bidet wash water discharge port 474c is provided further toward the tip of the nozzle 473 than is the gentle wash water discharge port 474b, and the gentle wash water discharge port 474b is provided further toward the tip of the nozzle 473 than is the bottom wash water discharge port 474a; however, the placement positions of the bottom wash water discharge port 474a, the gentle wash water discharge port 474b, and the bidet wash water discharge port 474c are not limited thereto. Although three water discharge ports are provided in the nozzle 473 illustrated in FIG. 1, for example, the gentle wash water discharge port 474b may be omitted, or four or more water discharge ports may be provided.

Figure 2:
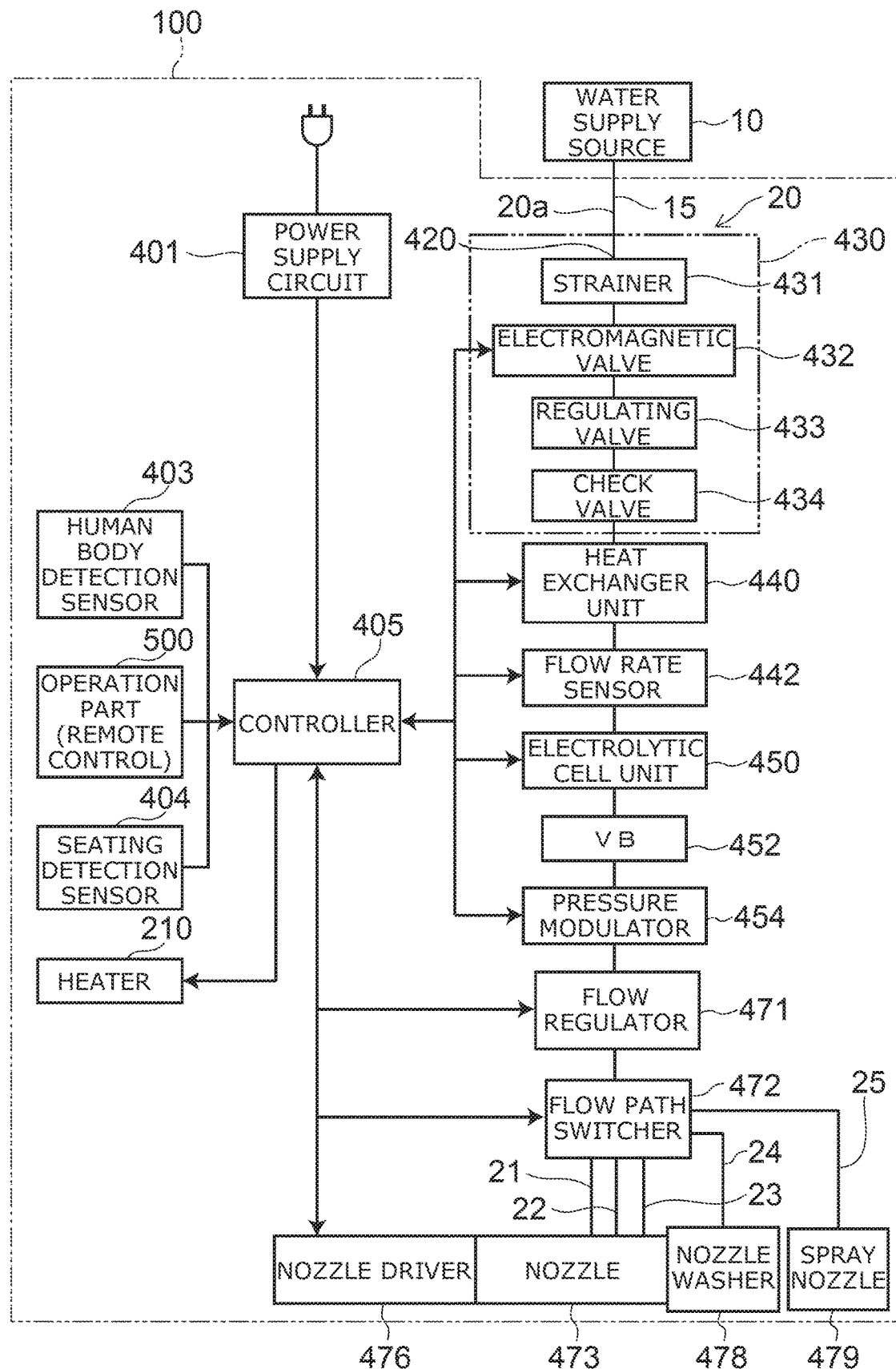
FIG. 2 is a block diagram schematically illustrating the relevant components of the sanitary washing device according to the embodiment.

FIG. 2 is a block diagram schematically illustrating the relevant components of the sanitary washing device according to the embodiment.

The relevant components of the water channel system and the electrical system are illustrated together in FIG. 2.

As illustrated in FIG. 2, the sanitary washing device 100 includes a water transfer part 20. The water transfer part 20 includes a pipe line 20a that reaches the nozzle 473 from a water supply source 10 such as a service water line, a water storage tank, etc. The water transfer part 20 guides the water supplied from the water supply source 10 to the nozzle 473 via the pipe line 20a. For example, the pipe line 20a is formed of parts such as a water supply hose 15, a water supply connection part 420, a valve unit 430, a heat exchanger unit 440, a flow path switcher 472, etc., described below and multiple pipes that connect these parts.

The water supply hose 15 supplies water from the water supply source 10 into the casing 400. The water supply hose 15 is a flexible hose. The water supply connection part 420 connects the water supply hose 15 and the valve unit 430. The water supply connection part 420 may be configured as an integral body with the valve unit 430 or may be configured as a separate body from the valve unit 430.

The valve unit 430 is provided downstream of the water supply hose 15 on the pipe line 20a. The valve unit 430 includes at least an electromagnetic valve 432. In the example, the valve unit 430 includes the electromagnetic valve 432, a strainer 431 provided upstream of the electromagnetic valve 432, a regulating valve 433 provided downstream of the electromagnetic valve 432, and a check valve 434 provided downstream of the regulating valve 433. For example, the valve unit 430 is provided downstream of the water supply hose 15 and upstream of the heat exchanger unit 440 on the pipe line 20a. The valve unit 430 may include the water supply connection part 420.

The strainer 431 is provided at the upstream side of the valve unit 430. The strainer 431 filters foreign matter, etc., included in the water supplied from the water supply source 10.

In the example, the water supply connection part 420 is configured to be an integral body with the strainer 431 at the upstream side of the strainer 431.

The electromagnetic valve 432 is provided downstream of the strainer 431. The electromagnetic valve 432 is an openable and closable electromagnetic valve and controls the supply of water based on a command from a controller 405 provided inside the casing 400. In other words, the electromagnetic valve 432 opens and closes the pipe line 20a. The water that is supplied from the water supply source 10 is caused to flow in the pipe line 20a by setting the electromagnetic valve 432 to the open state.

The regulating valve 433 is provided downstream of the electromagnetic valve 432. The regulating valve 433 regulates the pressure and the flow rate of the water inside the pipe line 20a. The regulating valve 433 is, for example, a pressure regulator valve that regulates the pressure inside the pipe line 20a to be within a prescribed range. The regulating valve 433 may be, for example, a constant flow rate valve that regulates the flow rate of the water flowing through the pipe line 20a to be within a prescribed range.

The check valve 434 is provided downstream of the regulating valve 433. The check valve 434 suppresses backflow of water toward the upstream side of the check valve 434 when the pressure inside the pipe line 20a decreases, etc. The check valve 434 is provided as necessary and is omissible.

The heat exchanger unit 440 (the heater) is provided downstream of the valve unit 430. The heat exchanger unit 440 includes a heater and heats the water supplied from the water supply source 10 to, for example, a specified temperature. In other words, the heat exchanger unit 440 produces warm water.

The heat exchanger unit 440 is, for example, an instant heating-type (instantaneous-type) heat exchanger using a ceramic heater, etc. Compared to a warm water storage heating-type heat exchanger that uses a warm water storage tank, the instant heating-type heat exchanger can heat water to a specified temperature in a short period of time. The heat exchanger unit 440 is not limited to an instant heating-type heat exchanger and may be a warm water storage heating-type heat exchanger. The heater is not limited to a heat exchanger; for example, another heating technique such as one that utilizes microwave heating, etc., may be used.

The heat exchanger unit 440 is connected to the controller 405. For example, the controller 405 heats the water to the temperature set by the operation part 500 by controlling the heat exchanger unit 440 according to an operation of the operation part 500 by the user.

A flow rate sensor 442 is provided downstream of the heat exchanger unit 440. The flow rate sensor 442 detects the flow rate of the water discharged from the heat exchanger unit 440. In other words, the flow rate sensor 442 detects the flow rate of the water flowing through the pipe line 20a. The flow rate sensor 442 is connected to the controller 405. The flow rate sensor 442 inputs the detection result of the flow rate to the controller 405. The flow rate sensor 442 may be provided upstream of the heat exchanger unit 440.

An electrolytic cell unit 450 is provided downstream of the flow rate sensor 442. The electrolytic cell unit 450 produces a liquid (functional water) including hypochlorous acid from tap water by electrolyzing the tap water flowing through the interior of the electrolytic cell unit 450. The electrolytic cell unit 450 is connected to the controller 405. The electrolytic cell unit 450 produces the functional water based on a control by the controller 405. The electrolytic cell unit 450 is provided as necessary and is omissible.

The functional water that is produced by the electrolytic cell unit 450 may be, for example, a solution including metal ions such as silver ions, copper ions, etc. Or, the functional water that is produced by the electrolytic cell unit 450 may be a solution including electrolytic chlorine, ozone, etc. Or, the functional water that is produced by the electrolytic cell unit 450 may be acidic water or alkaline water.

A vacuum breaker (VB) 452 is provided downstream of the electrolytic cell unit 450. The vacuum breaker 452 includes, for example, a flow channel where the water flows, an intake port for intaking air into the flow channel, and a valve mechanism that opens and closes the intake port. For example, the valve mechanism blocks the intake port when water is flowing in the flow channel, and intakes air into the flow channel by opening the intake port when the flow of the water stops. In other words, the vacuum breaker 452 intakes air into the pipe line 20*a* when water does not flow in the water transfer part 20. The valve mechanism includes, for example, a float valve. The vacuum breaker 452 may be provided upstream of the electrolytic cell unit 450.

For example, by intaking air into the pipe line 20*a* as recited above, the vacuum breaker 452 promotes the water drainage of the portion of the pipe line 20*a* downstream of the vacuum breaker 452. For example, the vacuum breaker 452 promotes the water drainage of the nozzle 473. Thus, by draining the water inside the nozzle 473 and intaking air into the nozzle 473, for example, the vacuum breaker 452 suppresses the undesirable backflow of the wash water inside the nozzle 473, the liquid waste collected in the bowl 801, etc., toward the water supply source 10 (the fresh water) side.

A pressure modulator 454 is provided downstream of the vacuum breaker 452. The pressure modulator 454 applies a pulsatory motion to the water discharged from the bottom wash water discharge port 474*a*, the gentle wash water discharge port 474*b*, and the bidet wash water discharge port 474*c* of the nozzle 473 and/or the water discharged from the water discharger of a nozzle washer 478 by applying a pulsatory motion or an acceleration to the flow of the water inside the pipe line 20*a* of the water transfer part 20. In other words, the pressure modulator 454 causes the fluidic state of the water flowing through the pipe line 20*a* to fluctuate. The pressure modulator 454 is connected to the controller 405. The pressure modulator 454 causes the fluidic state of the water to fluctuate based on a control by the controller 405. The pressure modulator 454 causes the pressure of the water inside the pipe line 20*a* to fluctuate. The pressure modulator 454 is provided as necessary and is omissible.

A flow regulator 471 is provided downstream of the pressure modulator 454. The flow regulator 471 regulates the water force (the flow rate). The flow path switcher 472 is provided downstream of the flow regulator 471. The flow path switcher 472 performs opening and closing and switching of the water supply to the nozzle 473 and/or the nozzle washer 478. The flow regulator 471 and the flow path switcher 472 may be provided as one unit. The flow regulator 471 and the flow path switcher 472 are connected to the controller 405. The operations of the flow regulator 471 and the flow path switcher 472 are controlled by the controller 405.

The nozzle 473, the nozzle washer 478, and a spray nozzle 479 are provided downstream of the flow path switcher 472. The nozzle 473 receives a drive force from a nozzle driver 476, advances into the bowl 801 of the toilet 800, and retracts from the interior of the bowl 801.

For example, the nozzle washer 478 washes the outer circumferential surface (the body) of the nozzle 473 by squirting water or functional water from a water discharger. The spray nozzle 479 sprays wash water or functional water in a mist form toward the bowl 801. In the example, the spray nozzle 479 is provided separately from the nozzle 473 for washing the human body. The spray nozzle 479 is not limited thereto; a water discharge port for spraying a mist-like liquid toward the bowl 801 may be provided in the nozzle 473.

A bottom wash channel 21, a gentle wash channel 22, and a bidet wash channel 23 that supply, to the nozzle 473, the water supplied from the water supply source 10 or the functional water produced by the electrolytic cell unit 450 via the water transfer part 20 also are provided downstream of the flow path switcher 472. The bottom wash channel 21 connects the flow path switcher 472 and the bottom wash water discharge port 474*a*. The gentle wash channel 22 connects the flow path switcher 472 and the gentle wash water discharge port 474*b*. The bidet wash channel 23 connects the flow path switcher 472 and the bidet wash water discharge port 474*c*.

A surface wash channel 24 and a spray channel 25 also are provided downstream of the flow path switcher 472. The surface wash channel 24 guides, toward the water discharger of the nozzle washer 478, the water supplied from the water supply source 10 or the functional water produced by the electrolytic cell unit 450 via the water transfer part 20. The spray channel 25 guides, to the spray nozzle 479, the water supplied from the water supply source 10 or the functional water produced by the electrolytic cell unit 450 via the water transfer part 20.

By controlling the flow path switcher 472, the controller 405 switches the opening and closing of the flow channels of the bottom wash channel 21, the gentle wash channel 22, the bidet wash channel 23, the surface wash channel 24, and the spray channel 25. Thus, the flow path switcher 472 switches between the state of communicating with the pipe line 20*a* and the state of not communicating with the pipe line 20*a* for each of the multiple water discharge ports of the bottom wash water discharge port 474*a*, the gentle wash water discharge port 474*b*, the bidet wash water discharge port 474*c*, the nozzle washer 478, the spray nozzle 479, etc.

Electrical power is supplied to the controller 405 from a power supply circuit 401, and the controller 405 controls the operations of the electromagnetic valve 432, the heat exchanger unit 440, the electrolytic cell unit 450, the pressure modulator 454, the flow regulator 471, the flow path switcher 472, the nozzle driver 476, etc., based on signals from a human body detection sensor 403, the seating detection sensor 404, the flow rate sensor 442, the operation part 500, etc. Thereby, the controller 405 is configured to control the operations of the nozzle 473, the valve unit 430, etc.

Figure 3:
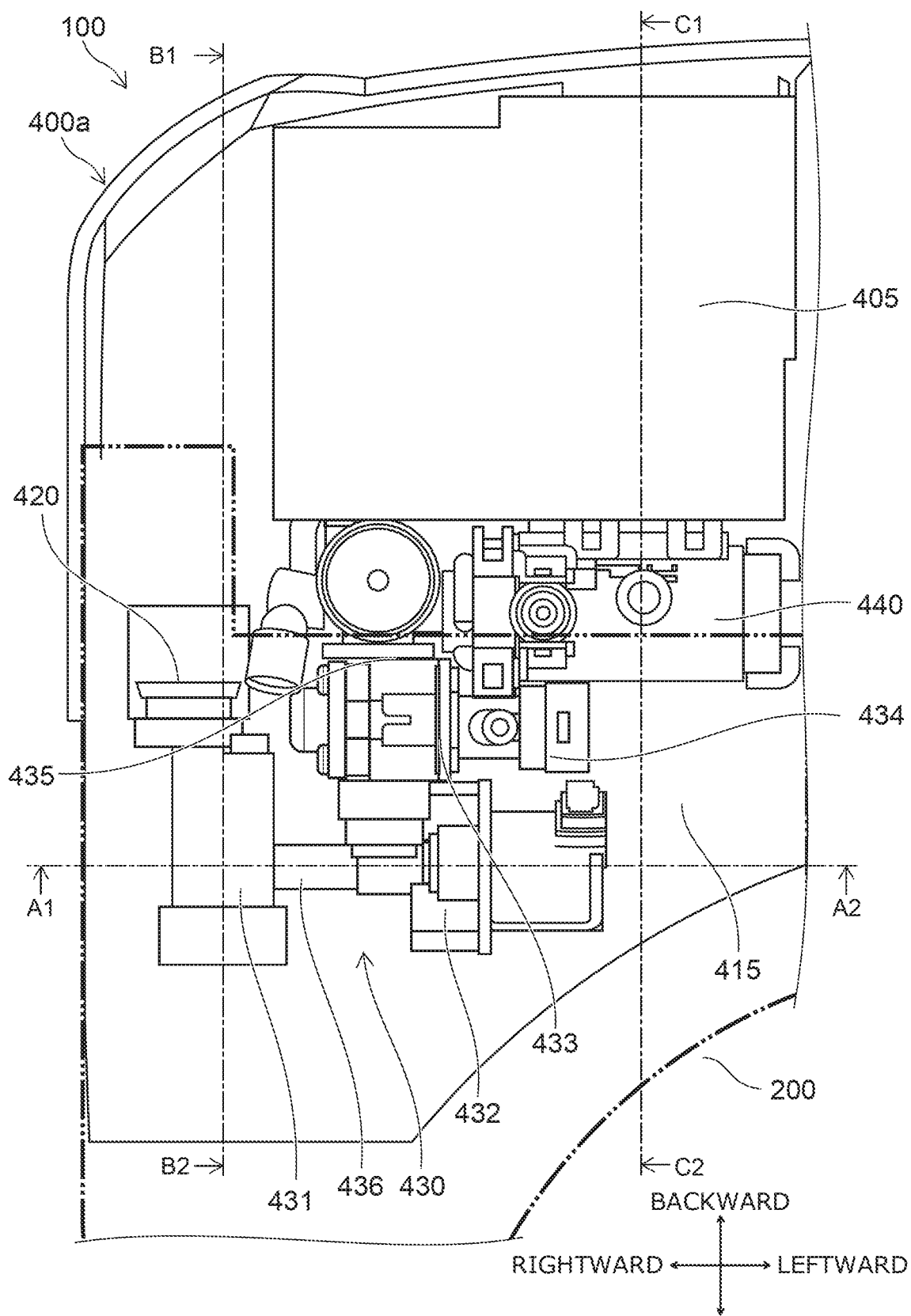
FIG. 3 is a plan view schematically illustrating a portion of the sanitary washing device according to the embodiment.

FIG. 3 is a plan view schematically illustrating a portion of the sanitary washing device according to the embodiment.

Figure 4:
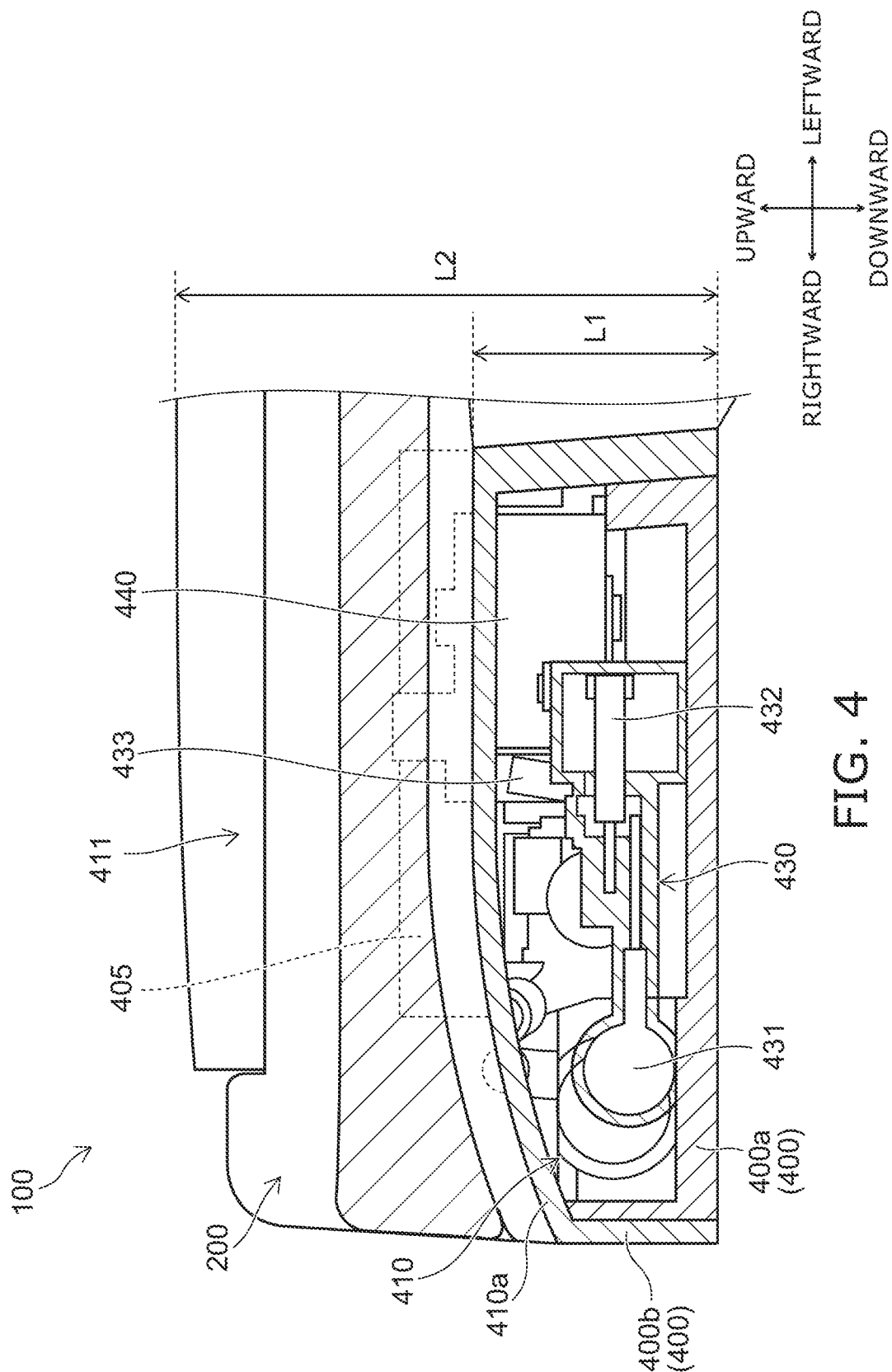
FIG. 4 is a cross-sectional view schematically illustrating portions of the sanitary washing device according to the embodiment.
Figure 5:
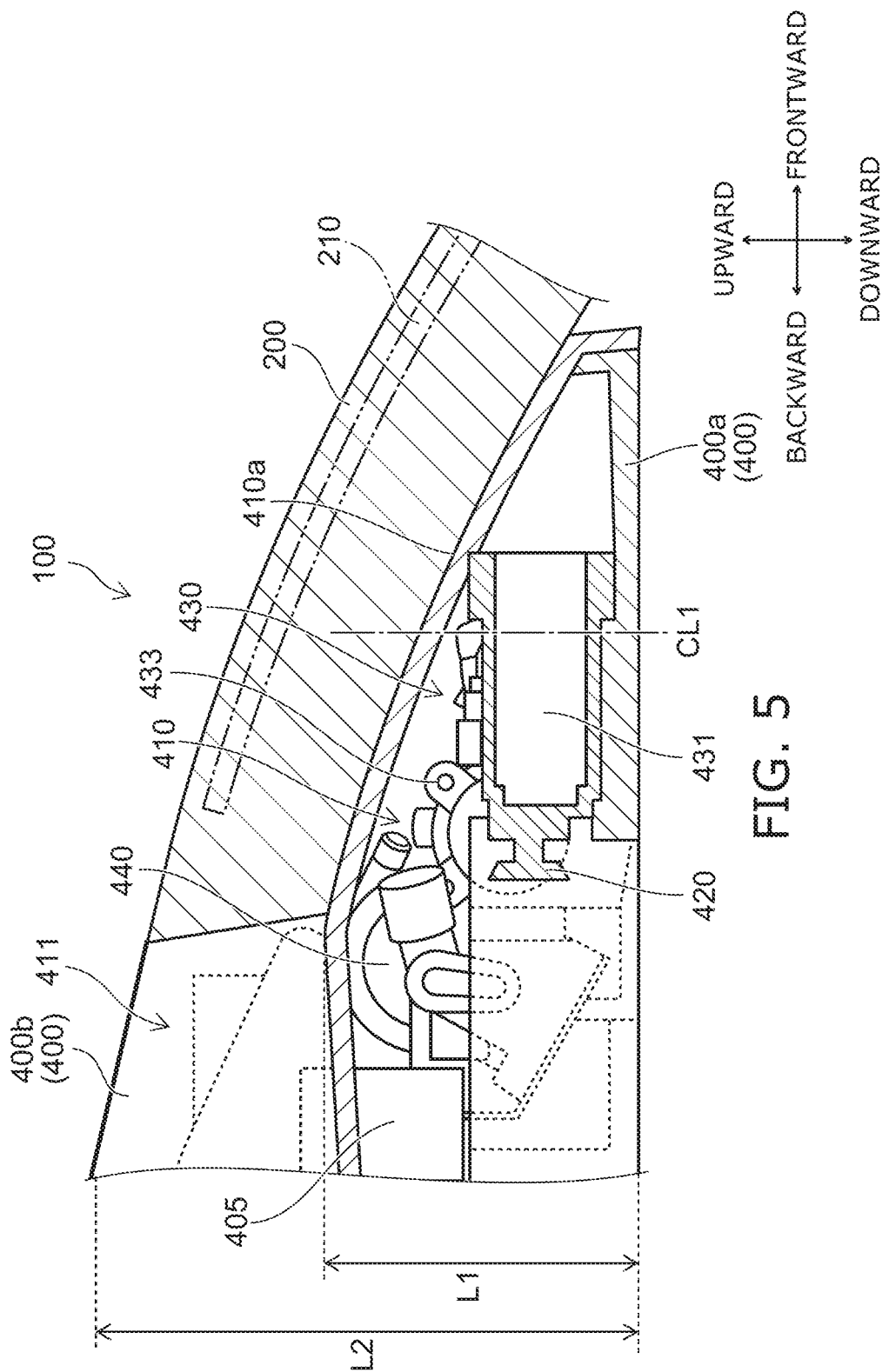
FIG. 5 is a cross-sectional view schematically illustrating portions of the sanitary washing device according to the embodiment.
Figure 6:
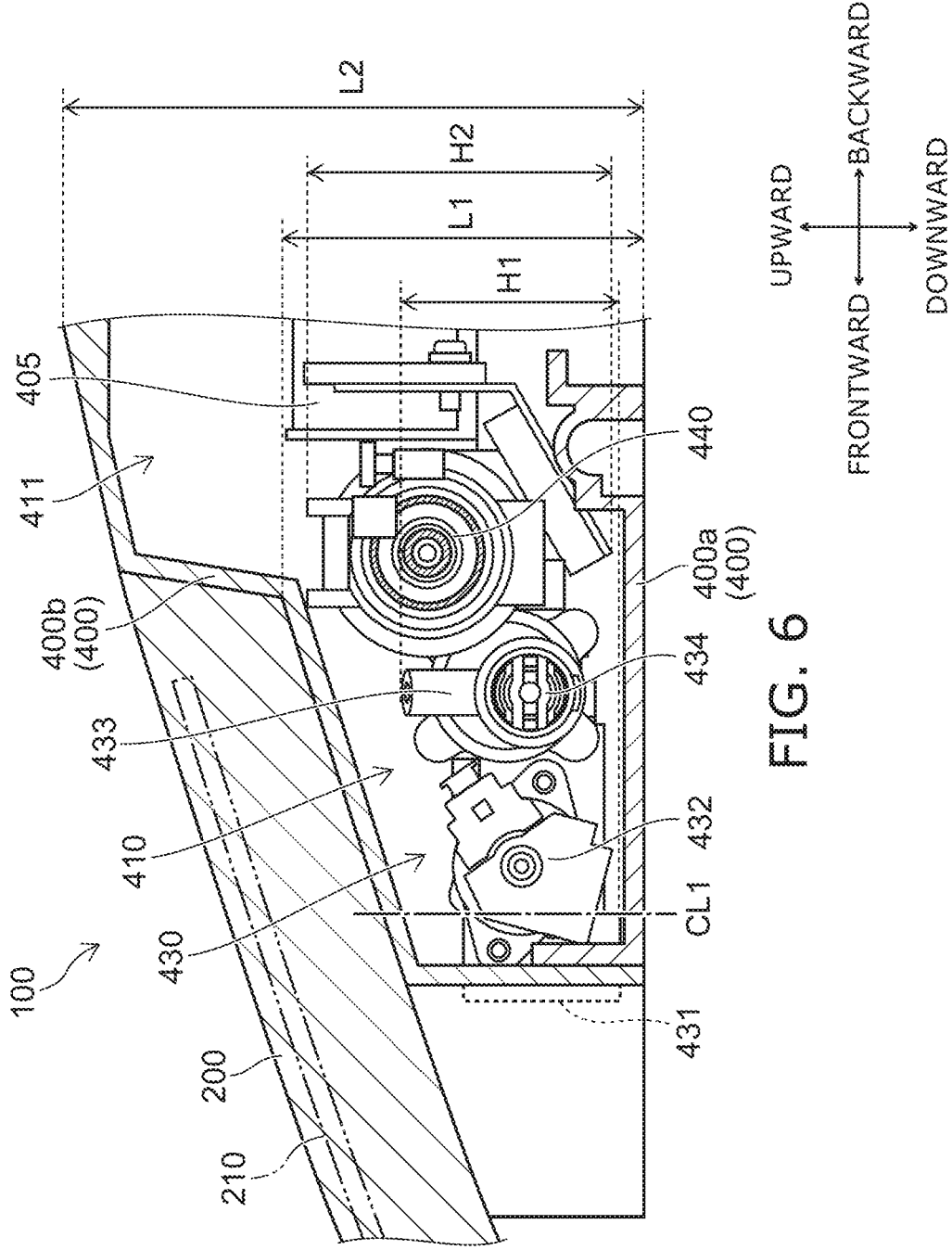
FIG. 6 is a cross-sectional view schematically illustrating portions of the sanitary washing device according to the embodiment.

FIG. 4 to FIG. 6 are cross-sectional views schematically illustrating portions of the sanitary washing device according to the embodiment.

FIG. 3 illustrates a state in which the toilet seat 200 and the case cover 400*b* are detached. The position of the toilet seat 200 is illustrated by a virtual line in FIG. 3.

FIG. 4 is a cross-sectional view along line A1-A2 shown in FIG. 3. FIG. 5 is a cross-sectional view along line B1-B2 shown in FIG. 3. FIG. 6 is a cross-sectional view along line C1-C2 shown in FIG. 3.

As illustrated in FIG. 3 to FIG. 6, the valve unit 430, the heat exchanger unit 440, and the controller 405 are provided inside the casing 400 (i.e., in a space between the case plate 400a and the case cover 400b). In other words, the valve unit 430, the heat exchanger unit 440, and the controller 405 are stored in the casing 400.

As illustrated in FIG. 3, FIG. 5, and FIG. 6, the valve unit 430 and the heat exchanger unit 440 are disposed further frontward than the controller 405. More specifically, the back end of the valve unit 430 is positioned further frontward than the front end of the controller 405. The back end of the heat exchanger unit 440 is positioned further frontward than the back end of the controller 405. The front end of the heat exchanger unit 440 is positioned further frontward than the front end of the controller 405.

As described below, the case plate 400a is tilted frontward and toward the lateral-direction center; therefore, by disposing the valve unit 430 further frontward than the controller 405, in the case of water leakage from the valve unit 430, contact with the controller 405 of water leaking from the valve unit 430 can be suppressed. As described below, the case plate 400a is tilted frontward and toward the lateral-direction center; therefore, by disposing the heat exchanger unit 440 further frontward than the controller 405, in the case of water leakage from the heat exchanger unit 440, contact with the controller 405 of water leaking from the heat exchanger unit 440 can be suppressed.

A drain path 415 is provided in the inner bottom surface of the casing 400 to drain, into the toilet 800, water leaking from the valve unit 430 and/or the heat exchanger unit 440 in the case of water leakage from the valve unit 430 and/or the heat exchanger unit 440. In other words, the drain path 415 is provided in the upper surface of the case plate 400a. The drain path 415 is described below.

By disposing the valve unit 430 further frontward than the controller 405, the drain path 415 from the valve unit 430 to the toilet 800 (a first region 415a described below) can be shortened. Thereby, the water that leaks from the valve unit 430 can be drained into the toilet 800 easily. Also, the tilt of the bottom surface of the casing 400 can be shortened because the drain path 415 can be shortened. Thereby, the length in the vertical direction of the casing 400 can be reduced, and the casing 400 can be more compact.

As illustrated in FIG. 5 and FIG. 6, at least a portion of the valve unit 430 is disposed below the toilet seat 200. In other words, at least a portion of the valve unit 430 overlaps the toilet seat 200 in the vertical direction. More specifically, at least a portion of the valve unit 430 is disposed below the heater 210 of the toilet seat 200. In other words, at least a portion of the valve unit 430 overlaps the heater 210 of the toilet seat 200 in the vertical direction. For example, the valve unit 430 is disposed below the back portion of the toilet seat 200. The back portion of the toilet seat 200 is a portion positioned backward of the longitudinal-direction center of the toilet seat 200.

Thus, at least a portion of the valve unit 430 is disposed below the toilet seat 200 including the heater 210 inside the toilet seat 200; thereby, freezing of the valve unit 430 can be suppressed by the heat from the heater 210. Damage of the valve unit 430 due to freezing can be suppressed thereby. In particular, the damage of the valve unit 430 due to freezing can be suppressed even when the valve unit 430 includes a hard material such as PPS or the like to increase the strength of the valve unit 430.

In the embodiment, it is favorable for 20% or more of the valve unit 430 to be positioned below the toilet seat 200. Here, "20%" is 20% of the surface area of the valve unit 430 when viewed in plan. That is, it is favorable for the surface area of the portion of the valve unit 430 overlapping the toilet seat 200 in the vertical direction when viewed in plan to be 20% or more of the surface area of the valve unit 430 entirety when viewed in plan. Also, in the embodiment, it is more favorable for 50% or more of the valve unit 430 to be positioned below the toilet seat 200.

Thus, because 20% or more of the valve unit 430 is positioned below the toilet seat 200, the heat from the toilet seat 200 can be transmitted to the valve unit 430 more efficiently. Thereby, the damage of the valve unit 430 due to freezing can be suppressed more reliably.

In the embodiment, the entire valve unit 430 may be disposed below the toilet seat 200. For example, the back end of the valve unit 430 may be positioned further frontward than the back end of the heater 210 of the toilet seat 200. Thereby, the heat from the toilet seat 200 can be transmitted to the valve unit 430 more efficiently.

In the example as illustrated in FIG. 3 to FIG. 6, the valve unit 430 includes the strainer 431, the electromagnetic valve 432, the regulating valve 433, and the check valve 434.

The strainer 431 is disposed below the toilet seat 200. In other words, the strainer 431 overlaps the toilet seat 200 in the vertical direction. More specifically, the strainer 431 is disposed below the heater 210 of the toilet seat 200. In other words, the strainer 431 overlaps the heater 210 of the toilet seat 200 in the vertical direction. For example, the back end of the strainer 431 is positioned frontward of the back end of the heater 210 of the toilet seat 200.

Thus, damage of the strainer 431 due to freezing can be suppressed by disposing the strainer 431 below the toilet seat 200. Thereby, the damage of the valve unit 430 due to freezing can be suppressed more reliably.

The electromagnetic valve 432 is disposed below the toilet seat 200. In other words, the electromagnetic valve 432 overlaps the toilet seat 200 in the vertical direction. More specifically, the electromagnetic valve 432 is disposed below the heater 210 of the toilet seat 200. In other words, the electromagnetic valve 432 overlaps the heater 210 of the toilet seat 200 in the vertical direction. For example, the back end of the electromagnetic valve 432 is positioned frontward of the back end of the heater 210 of the toilet seat 200.

Thus, damage of the electromagnetic valve 432 due to freezing can be suppressed by disposing the electromagnetic valve 432 below the toilet seat 200. Thereby, the damage of the valve unit 430 due to freezing can be suppressed more reliably.

The valve unit 430 also includes a reduced-diameter part 436 positioned between the strainer 431 and the electromagnetic valve 432. The reduced-diameter part 436 connects the strainer 431 and the electromagnetic valve 432. The inner diameter of the reduced-diameter part 436 is less than the inner diameter of the strainer 431.

The reduced-diameter part 436 is disposed below the toilet seat 200. In other words, the reduced-diameter part 436 overlaps the toilet seat 200 in the vertical direction. More specifically, the reduced-diameter part 436 is disposed below the heater 210 of the toilet seat 200. In other words, the reduced-diameter part 436 overlaps the heater 210 of the toilet seat 200 in the vertical direction. For example, the back end of the reduced-diameter part 436 is positioned frontward of the back end of the heater 210 of the toilet seat 200.

Thus, freezing of the reduced-diameter part 436 can be suppressed by disposing the reduced-diameter part 436 below the toilet seat 200. Clogging of the reduced-diameter part 436 due to freezing can be suppressed thereby. Accordingly, the damage of the valve unit 430 due to freezing can be suppressed more reliably.

The regulating valve 433 is disposed below the toilet seat 200. The check valve 434 is disposed below the toilet seat 200. A connection part 435 of the valve unit 430 and the heat exchanger unit 440 is disposed below the toilet seat 200.

As illustrated in FIG. 4 to FIG. 6, the casing 400 includes a low portion 410 positioned frontward and a high portion 411 positioned backward. The low portion 410 is positioned frontward of the high portion 411 and positioned below the toilet seat 200. The high portion 411 is positioned backward of the low portion 410 and positioned backward of the toilet seat 200. A length L2 in the vertical direction of the high portion 411 is greater than a length L1 in the vertical direction of the low portion 410. The valve unit 430 is disposed in the low portion 410 of the casing 400.

As illustrated in FIG. 5 and FIG. 6, an upper surface 410a of the low portion 410 becomes lower from the back toward the front. More specifically, the upper surface 410a of the low portion 410 becomes lower from the back end toward the front end.

Thus, by setting the upper surface 410a of the low portion 410 to become lower from the back toward the front, the joint between the toilet seat 200 and the casing 400 can be smooth. The designability can be improved thereby.

As illustrated in FIG. 4, the upper surface 410a of the low portion 410 becomes lower from the lateral-direction center toward the side. More specifically, the upper surface 410a of the low portion 410 becomes lower from the lateral-direction center toward the side end. In the example, the upper surface 410a of the low portion 410 becomes lower from the center (the left side) toward the right side.

The valve unit 430 will now be described in detail.

Figure 7A:
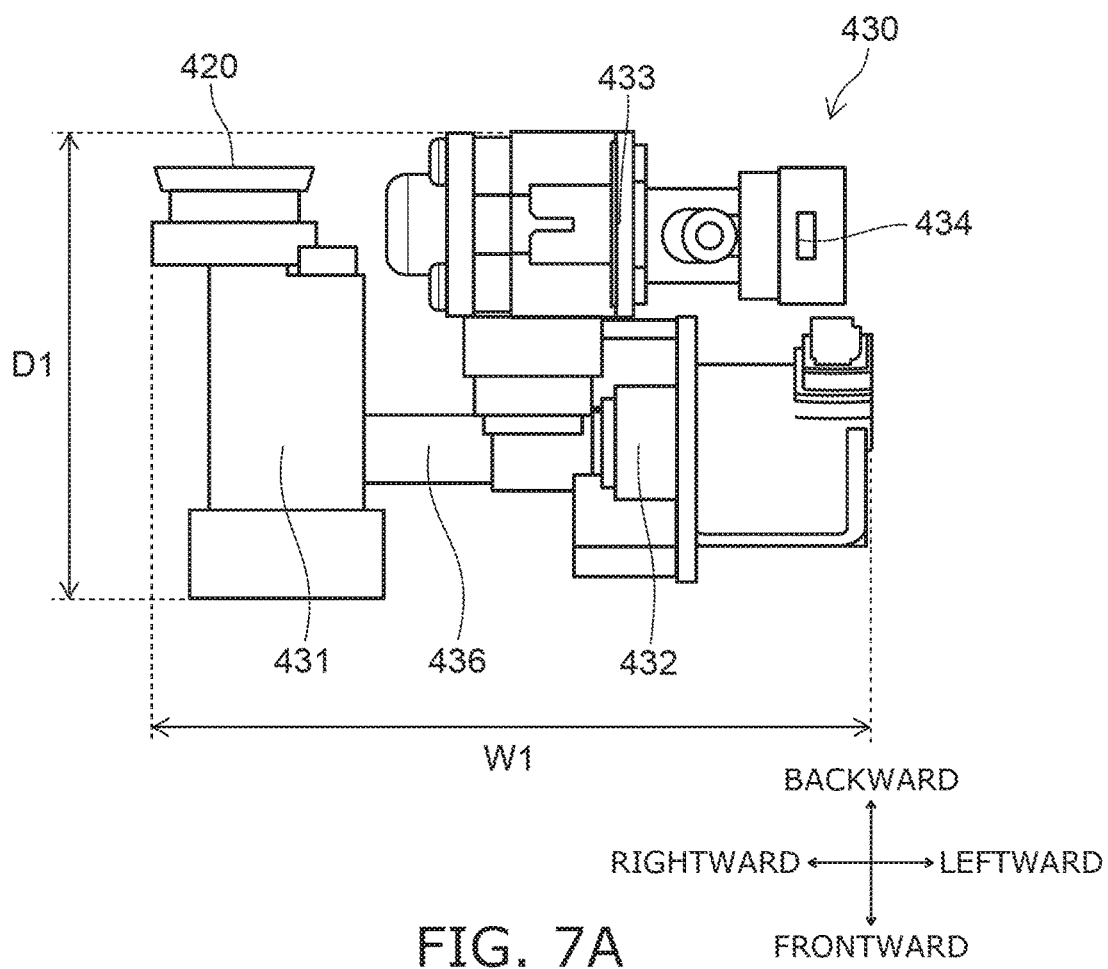
FIG. 7A and FIG. 7B are a plan view and a front view schematically illustrating the valve unit of the sanitary washing device according to the embodiment.

FIG. 7A is a plan view schematically illustrating the valve unit of the sanitary washing device according to the embodiment.

Figure 7B:
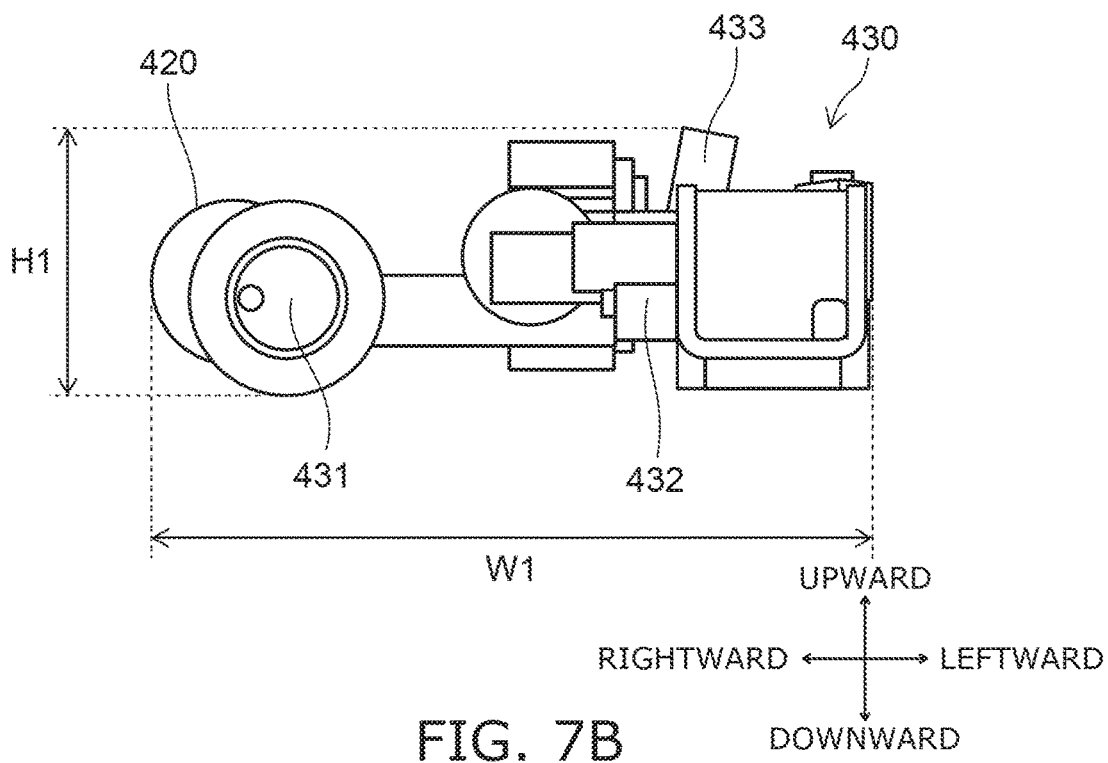

FIG. 7B is a front view schematically illustrating the valve unit of the sanitary washing device according to the embodiment.

Figure 8A:
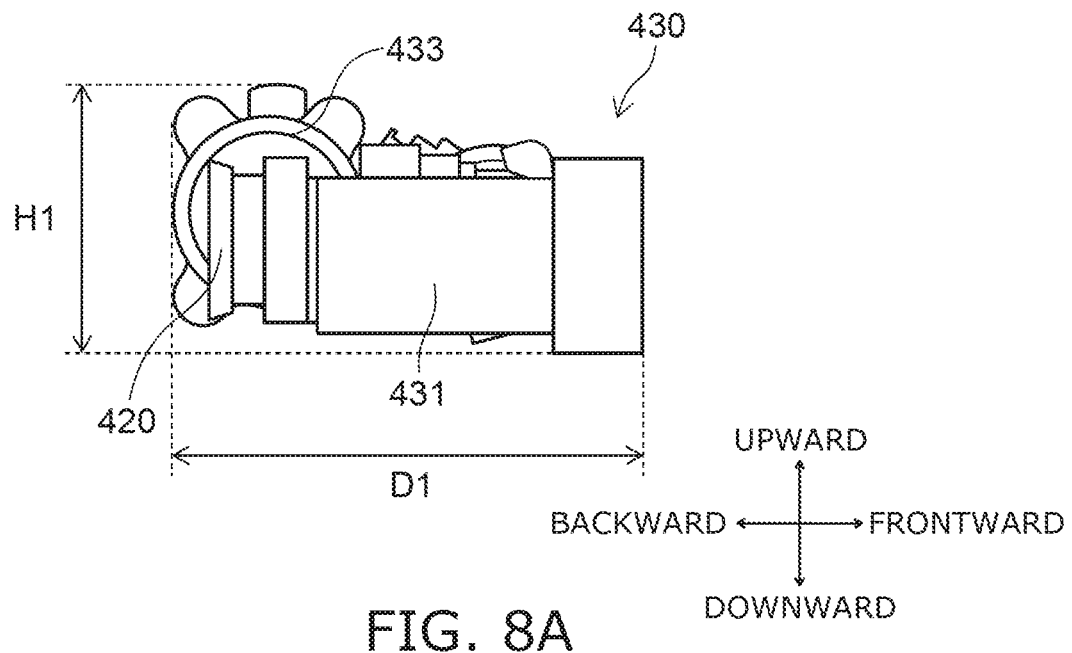
FIG. 8A and FIG. 8B are side views schematically illustrating the valve unit of the sanitary washing device according to the embodiment.
Figure 8B:
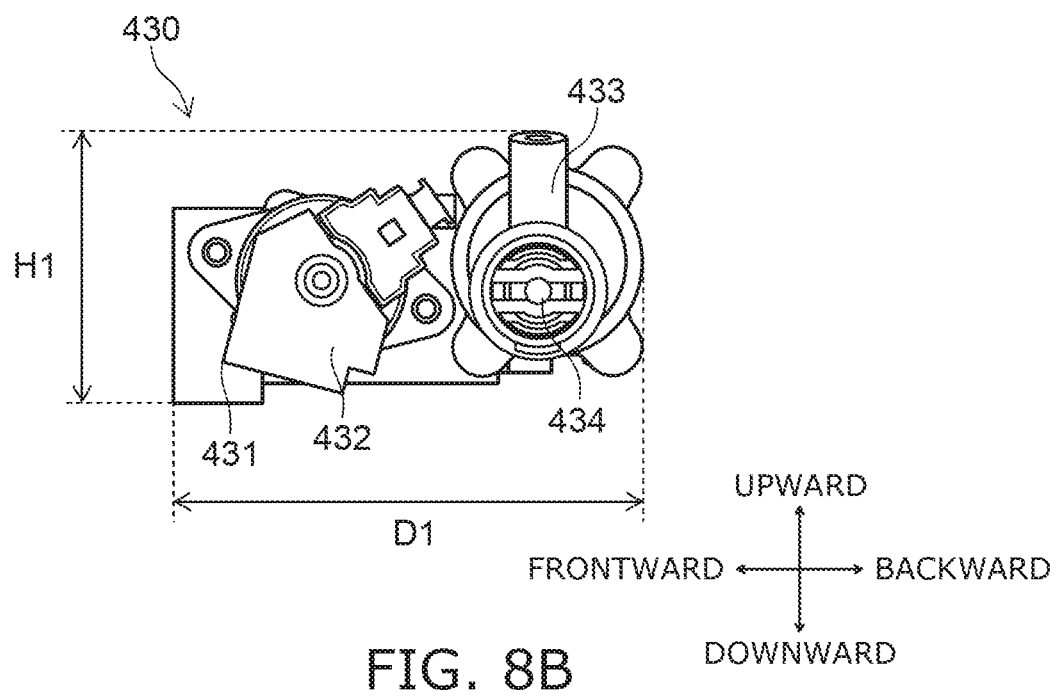

FIG. 8A and FIG. 8B are side views schematically illustrating the valve unit of the sanitary washing device according to the embodiment. FIG. 8A is a side view of the valve unit 430 when viewed from the right. FIG. 8B is a side view of the valve unit 430 when viewed from the left.

As illustrated in FIG. 7A, FIG. 7B, FIG. 8A, and FIG. 8B, a length H1 in the vertical direction of the valve unit 430 is less than a length D1 in the longitudinal direction of the valve unit 430. That is, the length D1 in the longitudinal direction of the valve unit 430 is greater than the length H1 in the vertical direction of the valve unit 430. The length H1 in the vertical direction of the valve unit 430 is less than a length W1 in the lateral direction of the valve unit 430. That is, the length W1 in the lateral direction of the valve unit 430 is greater than the length H1 in the vertical direction of the valve unit 430.

Here, the length H1 in the vertical direction of the valve unit 430 is the distance from the lower end of the lowermost part included in the valve unit 430 to the upper end of the uppermost part included in the valve unit 430. In the example, the length H1 in the vertical direction of the valve unit 430 is the distance from the lower end of the strainer 431 to the upper end of the regulating valve 433.

The length D1 in the longitudinal direction of the valve unit 430 is the distance from the front end of the frontmost part included in the valve unit 430 to the back end of the backmost part included in the valve unit 430. In the example, the length D1 in the longitudinal direction of the valve unit 430 is the distance from the front end of the strainer 431 to the back end of the regulating valve 433.

The length W1 in the lateral direction of the valve unit 430 is the distance from the right end of the rightmost part included in the valve unit 430 to the left end of the leftmost part included in the valve unit 430. In the example, the length W1 in the lateral direction of the valve unit 430 is the distance from the right end of the strainer 431 to the left end of the electromagnetic valve 432.

Thus, by setting the length H1 in the vertical direction of the valve unit 430 to be less than the length D1 in the longitudinal direction of the valve unit 430 and less than the length W1 in the lateral direction of the valve unit 430, the valve unit 430 can be disposed in the low portion 410 at the front portion of the casing 400 which conventionally is a dead space. Thereby, the dead space inside the casing 400 can be reduced, and the casing 400 can be more compact.

By setting the length H1 in the vertical direction of the valve unit 430 to be less than the length D1 in the longitudinal direction of the valve unit 430 and less than the length W1 in the lateral direction of the valve unit 430, in the case of water leakage from the valve unit 430, the contact with the controller 405 of water leaking from the valve unit 430 can be suppressed more reliably.

By setting the length D1 in the longitudinal direction of the valve unit 430 and the length W1 in the lateral direction of the valve unit 430 to be greater than the length H1 in the vertical direction of the valve unit 430, the surface area of the valve unit 430 opposing the toilet seat 200 can be increased. Thereby, the heat from the toilet seat 200 can be transmitted to the valve unit 430 more efficiently, and the damage of the valve unit 430 due to freezing can be suppressed more reliably. By reducing the length in the vertical direction of the casing 400, the casing 400 can be more compact.

As illustrated in FIG. 7A, for example, the length D1 in the longitudinal direction of the valve unit 430 is less than the length W1 in the lateral direction of the valve unit 430.

Thus, by setting the length D1 in the longitudinal direction of the valve unit 430 to be less than the length W1 in the lateral direction of the valve unit 430, the valve unit 430 can be disposed further frontward in the low portion 410. Thereby, the dead space inside the casing 400 can be reduced further, and the casing 400 can be even more compact.

By setting the length D1 in the longitudinal direction of the valve unit 430 to be less than the length W1 in the lateral direction of the valve unit 430, the drain path 415 from the valve unit 430 to the toilet 800 (the first region 415a described below) can be shortened. Thereby, the water that leaks from the valve unit 430 can be drained into the toilet 800 more easily, and the casing 400 can be more compact.

By setting the length D1 in the longitudinal direction of the valve unit 430 to be less than the length W1 in the lateral direction of the valve unit 430, even when the valve unit 430 is disposed below the back portion of the toilet seat 200, a wider range of the valve unit 430 can be disposed below the toilet seat 200. Thereby, the heat from the toilet seat 200 can be transmitted to the valve unit 430 more efficiently, and the damage of the valve unit 430 due to freezing can be suppressed more reliably. By reducing the length in the longitudinal direction of the casing 400, the casing 400 can be more compact.

As illustrated in FIG. 8A and FIG. 8B, the upper end of the valve unit 430 becomes lower from the back toward the front. That is, the valve unit 430 is provided so that the upper end of the valve unit 430 conforms to the upper surface 410a of the low portion 410 in the longitudinal direction. More specifically, the highest part included in the valve unit 430 is disposed at the back of the valve unit 430, and the lowest part is disposed at the front of the valve unit 430.

In the example, the height of the strainer 431 is less than the height of the electromagnetic valve 432. The strainer 431 is disposed further frontward than the electromagnetic valve 432. More specifically, the front end of the strainer 431 is positioned further frontward than the front end of the electromagnetic valve 432. Also, the height of the regulating valve 433 is greater than the height of the electromagnetic valve 432. The regulating valve 433 is disposed further backward than the electromagnetic valve 432. More specifically, the front end of the regulating valve 433 is positioned further backward than the front end of the electromagnetic valve 432.

Thus, by setting the upper end of the valve unit 430 to become lower from the back toward the front, the valve unit 430 is easily disposed in the low portion 410 even when the upper surface 410a of the low portion 410 becomes lower from the back toward the front.

By setting the upper end of the valve unit 430 to become lower from the back toward the front, the valve unit 430 can be prevented from being too proximate to the upper portion (the case cover 400b) of the casing 400 even when the valve unit 430 is disposed in the low portion 410 of which the upper surface 410a becomes lower from the back toward the front. Thereby, in the case of water leakage from the valve unit 430, contact with the upper portion (the case cover 400b) of the casing 400 can be suppressed for water leaking from the valve unit 430, and water leakage outside the device from the valve unit 430 through a gap in the casing (a gap between the case plate 400a and the case cover 400b) can be suppressed.

As illustrated in FIG. 7B, the upper end of the valve unit 430 becomes lower from the lateral-direction center toward the side. That is, the valve unit 430 is provided so that the upper end of the valve unit 430 conforms to the upper surface 410a of the low portion 410 in the lateral direction. More specifically, the highest part included in the valve unit 430 is disposed at the lateral-direction center of the valve unit 430, and the lowest part is disposed sideward in the valve unit 430.

In the example, the height of the strainer 431 is less than the height of the electromagnetic valve 432. The strainer 431 is disposed further toward the side end (in the example, rightward) than the electromagnetic valve 432. More specifically, the right end of the strainer 431 is positioned further toward the side end (rightward) than the right end of the electromagnetic valve 432. The height of the regulating valve 433 is greater than the height of the electromagnetic valve 432. The regulating valve 433 is disposed further toward the center (in the example, leftward) than the electromagnetic valve 432. More specifically, the right end of the regulating valve 433 is positioned further toward the center (leftward) than the right end of the electromagnetic valve 432.

Thus, by setting the upper end of the valve unit 430 to become lower from the lateral-direction center toward the side, the valve unit 430 is easily disposed in the low portion 410 even when the upper surface 410a of the low portion 410 becomes lower from the lateral-direction center toward the side.

By setting the upper end of the valve unit 430 to become lower from the lateral-direction center toward the side, the valve unit 430 being too proximate to the upper portion (the case cover 400b) of the casing 400 can be suppressed even when the valve unit 430 is disposed in the low portion 410 of which the upper surface 410a becomes lower from the lateral-direction center toward the side. Thereby, in the case of water leakage from the valve unit 430, the contact with the upper portion (the case cover 400b) of the casing 400 can be suppressed for water leaking from the valve unit 430, and the water leakage outside the device from the valve unit 430 through a gap in the casing (a gap between the case plate 400a and the case cover 400b) can be suppressed.

As illustrated in FIG. 5 and FIG. 6, the toilet seat 200 is provided along the upper surface 410a of the low portion 410 in the longitudinal direction. As described above, the valve unit 430 is provided so that the upper end of the valve unit 430 conforms to the upper surface 410a of the low portion 410 in the longitudinal direction.

Thus, by setting the upper end of the valve unit 430 to become lower from the back toward the front to conform to the upper surface 410a of the low portion 410 in the longitudinal direction, and by providing the toilet seat 200 along the upper surface 410a of the low portion 410 in the longitudinal direction, the heat from the toilet seat 200 can be transmitted to the valve unit 430 more efficiently. Thereby, the damage of the valve unit 430 due to freezing can be suppressed more reliably.

As illustrated in FIG. 4, the toilet seat 200 is provided along the upper surface 410a of the low portion 410 in the lateral direction. As described above, the valve unit 430 is provided so that the upper end of the valve unit 430 conforms to the upper surface 410a of the low portion 410 in the lateral direction.

Thus, by setting the upper end of the valve unit 430 to become lower from the lateral-direction center toward the side to conform to the upper surface 410a of the low portion 410 in the lateral direction, and by providing the toilet seat 200 along the upper surface 410a of the low portion 410 in the lateral direction, the heat from the toilet seat 200 can be transmitted to the valve unit 430 more efficiently. Thereby, the damage of the valve unit 430 due to freezing can be suppressed more reliably.

As illustrated in FIG. 3 and FIG. 6, the heat exchanger unit 440 is disposed further backward than the valve unit 430. More specifically, the front end of the heat exchanger unit 440 is positioned backward of the front end of the valve unit 430. The back end of the heat exchanger unit 440 is positioned backward of the back end of the valve unit 430. In the example, the heat exchanger unit 440 is disposed between the controller 405 and the valve unit 430 in the longitudinal direction. A length H2 in the vertical direction of the heat exchanger unit 440 is greater than the length H1 in the vertical direction of the valve unit 430.

Thus, by disposing the heat exchanger unit 440 further backward than the valve unit 430, the heat exchanger unit 440 can be disposed at a position having few height constraints. Thereby, the length H2 in the vertical direction of the heat exchanger unit 440 can be greater than the length H1 in the vertical direction of the valve unit 430, and the stored water amount of the heat exchanger unit 440 can be increased.

By disposing the heat exchanger unit 440 between the controller 405 and the valve unit 430 in the longitudinal direction, the distance between the controller 405 and the valve unit 430 can be increased. Thereby, in the case of water leakage from the valve unit 430, the contact with the controller 405 of water leaking from the valve unit 430 can be suppressed more reliably. Also, when the length H2 in the vertical direction of the heat exchanger unit 440 is greater than the length H1 in the vertical direction of the valve unit 430, the heat exchanger unit 440 acts as a wall; thereby, the contact with the controller 405 of water leaking from the valve unit 430 can be suppressed more reliably.

As illustrated in FIG. 3 and FIG. 6, the heat exchanger unit 440 is disposed further backward than the back end of the heater 210 of the toilet seat 200. More specifically, the front end of the heat exchanger unit 440 is positioned further backward than the back end of the heater 210 of the toilet seat 200.

For example, the controller 405 performs freeze prevention control so that the heat exchanger unit 440 does not freeze. Because the heat exchanger unit 440 does not freeze easily due to the freeze prevention control, it is unnecessary to suppress the freezing of the valve unit 430 or the like due to the heat from the toilet seat 200. Therefore, the heat exchanger unit 440 may be disposed further backward than the back end of the heater 210 of the toilet seat 200. Thus, by disposing the heat exchanger unit 440 further backward than the back end of the heater 210 of the toilet seat 200, it is easy to ensure space for disposing the valve unit 430 below the toilet seat 200. Thereby, the space below the toilet seat 200 can be effectively used, and the casing 400 can be more compact.

As illustrated in FIG. 6, for example, the front end of the heat exchanger unit 440 is positioned in the low portion 410. Thus, by positioning the front end of the heat exchanger unit 440 in the low portion 410, at least a portion of the heat exchanger unit 440 can be disposed in the low portion 410. Thereby, the heat exchanger unit 440 can be disposed at the front of the casing 400, and the casing 400 can be even more compact.

As illustrated in FIG. 3, the connection part 435 of the heat exchanger unit 440 and the valve unit 430 is disposed frontward of the heat exchanger unit 440. In other words, the valve unit 430 is connected to the heat exchanger unit 440 at the front of the heat exchanger unit 440.

Thus, by disposing the connection part 435 of the heat exchanger unit 440 and the valve unit 430 frontward of the heat exchanger unit 440, in the case of water leakage from the connection part 435, contact with the controller 405 of water leaking from the connection part 435 can be suppressed. In other words, by positioning the heat exchanger unit 440 between the connection part 435 and the controller 405, the heat exchanger unit 440 acts as a wall, and the contact with the controller 405 of water leaking from the connection part 435 can be suppressed.

As illustrated in FIG. 5 and FIG. 6, for example, the upper surface 410a of the low portion 410 is a curved surface that is upwardly convex in the longitudinal direction. For example, the upper surface 410a of the low portion 410 may have multiple tilted surfaces in the longitudinal direction. In such a case, for example, the upper surface 410a of the low portion 410 is configured so that the tilt angle with respect to the horizontal plane increases frontward.

Thus, by setting the upper surface 410a of the low portion 410 to be a curved surface that is upwardly convex in the longitudinal direction, the space in the low portion 410 can be wider. Thereby, the valve unit 430 is easier to dispose in the low portion 410.

As illustrated in FIG. 5 and FIG. 6, for example, at least a portion of the valve unit 430 is disposed further backward than a longitudinal-direction center CL1 of the low portion 410. In other words, the longitudinal-direction center CL1 of the low portion 410 overlaps the valve unit 430 in the longitudinal direction.

Thus, by disposing at least a portion of the valve unit 430 further backward than the longitudinal-direction center CL1 of the low portion 410, the valve unit 430 can be disposed at a position having few height constraints.

Figure 9:
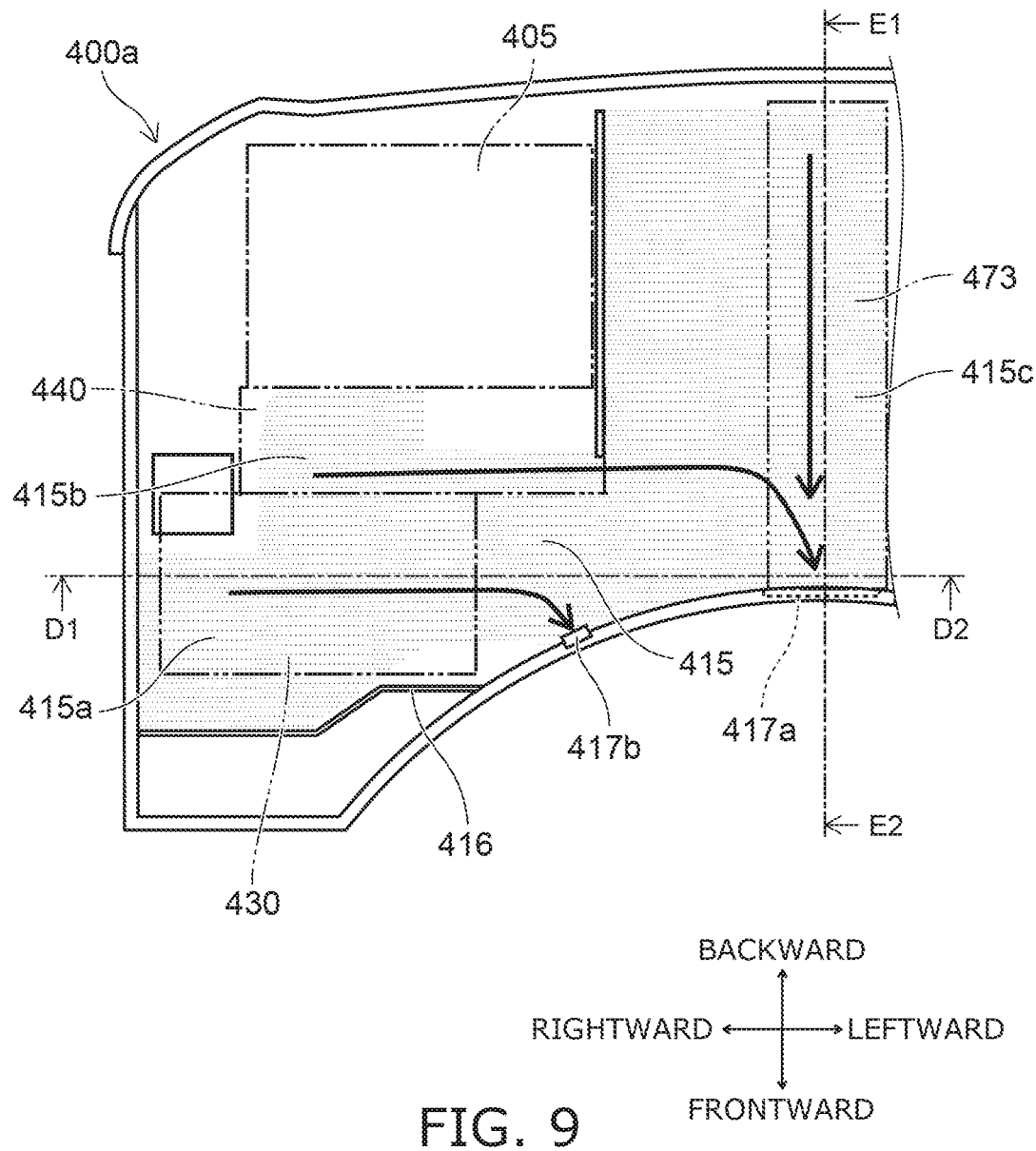
FIG. 9 is a plan view schematically illustrating a portion of the casing of the sanitary washing device according to the embodiment.

FIG. 9 is a plan view schematically illustrating a portion of the casing of the sanitary washing device according to the embodiment.

Figure 10A:
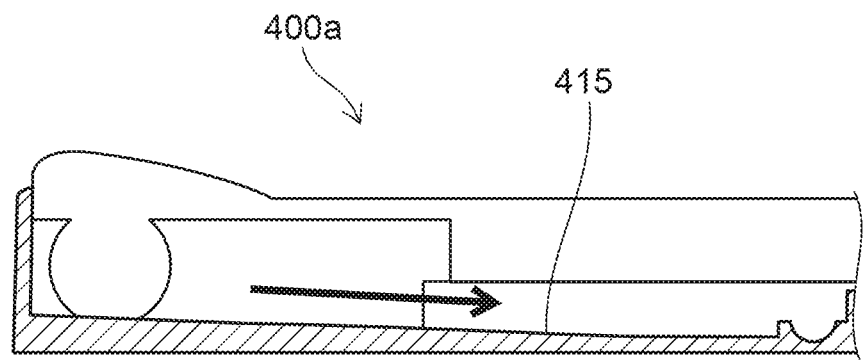
FIG. 10A and FIG. 10B are cross-sectional views schematically illustrating portions of the casing of the sanitary washing device according to the embodiment.
Figure 10B:
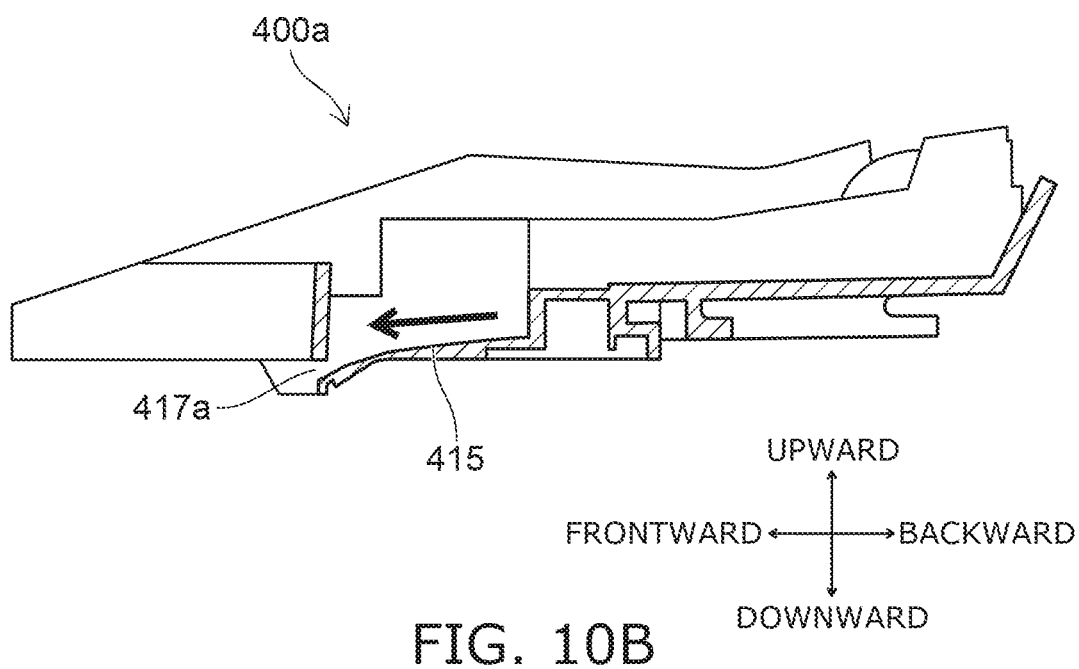

FIG. 10A and FIG. 10B are cross-sectional views schematically illustrating portions of the casing of the sanitary washing device according to the embodiment.

Figure 11:
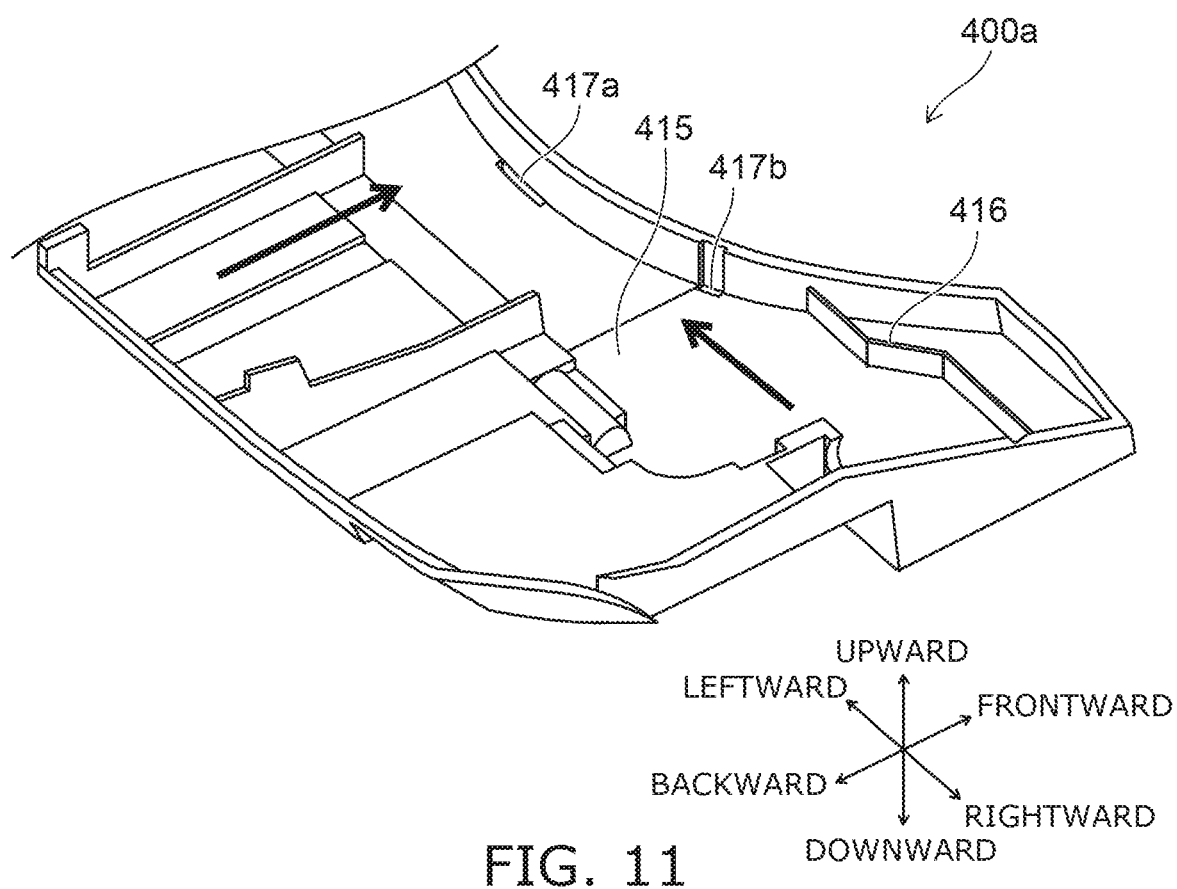
FIG. 11 is a perspective view schematically illustrating a portion of the casing of the sanitary washing device according to the embodiment.

FIG. 11 is a perspective view schematically illustrating a portion of the casing of the sanitary washing device according to the embodiment.

The flow of water on the case plate 400a is illustrated by arrows in FIG. 9, FIG. 10A, FIG. 10B, and FIG. 11.

In FIG. 9, the positions of the valve unit 430, the heat exchanger unit 440, the controller 405, and the nozzle 473 are illustrated by virtual lines. FIG. 10A is a cross-sectional view along line D1-D2 shown in FIG. 9. FIG. 10B is a cross-sectional view along line E1-E2 shown in FIG. 9.

As illustrated in FIG. 9, FIG. 10A, FIG. 10B, and FIG. 11, the casing 400 includes the drain path 415 at the inner bottom surface. For example, the drain path 415 is provided at the upper surface of the case plate 400a. The water that is on the inner bottom surface of the casing 400 (the upper surface of the case plate 400a) is drained into the toilet 800 via the drain path 415.

As illustrated in FIG. 9, the drain path 415 does not overlap the controller 405 in the vertical direction. The drain path 415 includes, for example, the first to third regions 415a to 415c. At least a portion of the first region 415a overlaps the valve unit 430 in the vertical direction. The water that leaks from the valve unit 430 is drained into the toilet 800 via the first region 415a. At least a portion of the second region 415b overlaps the heat exchanger unit 440 in the vertical direction. The water that leaks from the heat exchanger unit 440 is drained into the toilet 800 via the second region 415b. At least a portion of the third region 415c overlaps the nozzle 473 in the vertical direction. The water that leaks from the nozzle 473 is drained into the toilet 800 via the third region 415c.

The first region 415a and the second region 415b are positioned frontward of the controller 405. More specifically, the back end of the first region 415a and the back end of the second region 415b are positioned frontward of the front end of the controller 405. The first region 415a is positioned frontward of the second region 415b. The third region 415c is positioned sideward of the controller 405. The third region 415c is positioned sideward the first region 415a and the second region 415b. The third region 415c is positioned further toward the lateral-direction center than are the first region 415a and the second region 415b.

As illustrated in FIG. 10A, a tilted surface that is tilted downward from the lateral-direction end portion toward the center is provided in the first region 415a of the drain path 415. Similarly, a tilted surface that is tilted downward from the lateral-direction end portion toward the center is provided in the second region 415b. The water that is on the first region 415a and the second region 415b flows toward the lateral-direction center along the tilted surfaces.

As illustrated in FIG. 10B, a tilted surface that is tilted downward from the back toward the front is provided in the third region 415c of the drain path 415. The water that is on the third region 415c flows frontward along the tilted surface.

As illustrated in FIG. 9 and FIG. 11, a drain guide part 416 is provided at the upper surface of the case plate 400a. The drain guide part 416 is provided frontward of the valve unit 430. The drain guide part 416 is, for example, a vertical surface (a rib) extending upward from the upper surface of the case plate 400a. The water that is on the case plate 400a is dammed by the drain guide part 416 so that water does not flow frontward of the drain guide part 416. In other words, the drain guide part 416 guides the water on the case plate 400a toward the lateral-direction center.

As illustrated in FIG. 9 and FIG. 10B, the casing 400 has a first drain port 417a and a second drain port 417b provided in the bottom portion of the casing 400. For example, the first drain port 417a and the second drain port 417b are provided in the case plate 400a. The water that is on the case plate 400a is drained into the toilet 800 via the first drain port 417a and the second drain port 417b. That is, the first drain port 417a and the second drain port 417b are positioned inside the opening of the bowl 801 in the state in which the sanitary washing device 100 is mounted on the toilet 800. The first drain port 417a and the second drain port 417b may be notches.

The first drain port 417a is a drain port provided proximately to the nozzle 473. The second drain port 417b is a drain port provided proximately to the valve unit 430. In other words, the distance between the first drain port 417a and the nozzle 473 is less than the distance between the second drain port 417b and the nozzle 473. Also, the distance between the second drain port 417b and the valve unit 430 is less than the distance between the first drain port 417a and the valve unit 430.

Thus, because the second drain port 417b is proximate to the valve unit, the water that leaks from the valve unit 430 can be drained from the second drain port 417b proximate to the valve unit 430 without needing to guide the water to the first drain port 417a proximate to the nozzle 473. Thereby, the drain path 415 (the first region 415a) from the valve unit 430 to the toilet 800 can be shortened, and the water that leaks from the valve unit 430 can be drained more easily into the toilet 800. Since the drain path 415 can be shortened, the length in the vertical direction of the casing 400 can be reduced, and the casing 400 can be more compact.

Figure 12:
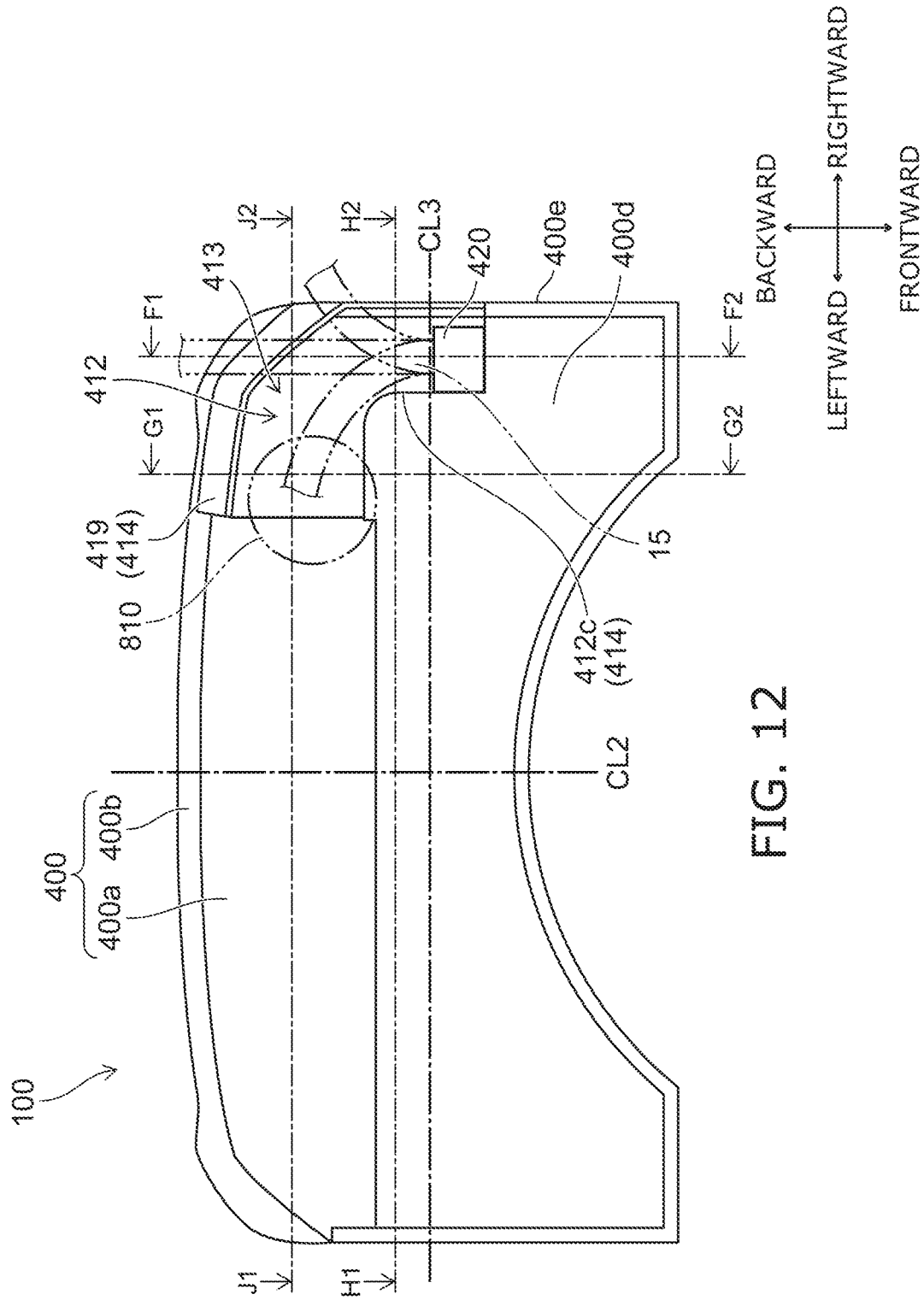
FIG. 12 is a plan view schematically illustrating the sanitary washing device according to the embodiment.

FIG. 12 is a plan view schematically illustrating the sanitary washing device according to the embodiment.

FIG. 12 is a plan view of the sanitary washing device 100 when viewed from below.

FIG. 13 to FIG. 16 are cross-sectional views schematically illustrating the sanitary washing device according to the embodiment.

The state in which the toilet seat 200 is detached is illustrated in FIG. 12 to FIG. 16.

The position of the water supply hose 15 is illustrated by a virtual line in FIG. 12, FIG. 13, FIG. 15, and FIG. 16. The position of a through-hole 810 of the toilet 800 is illustrated by a virtual line in FIG. 12.

Figure 13:
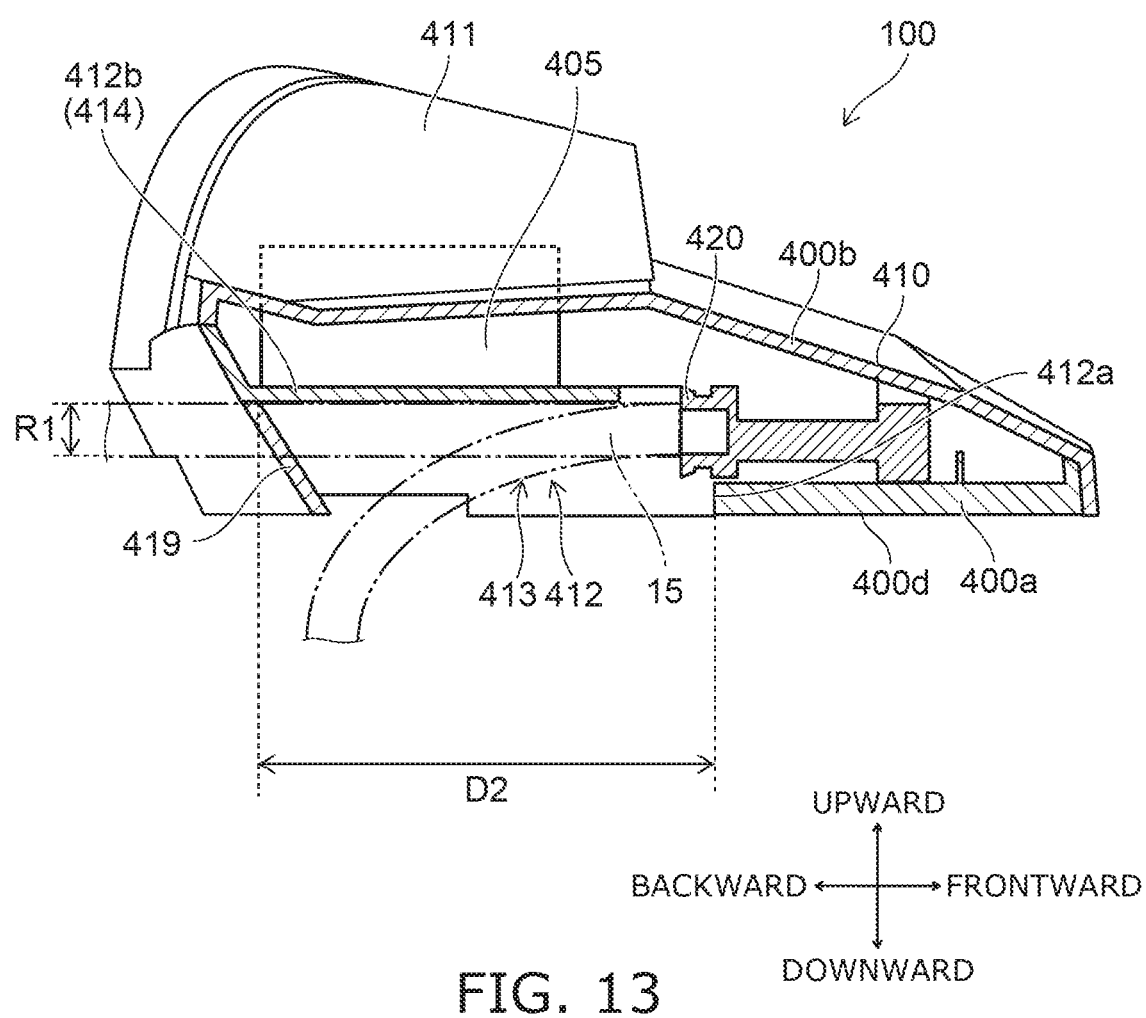
FIG. 13 is a cross-sectional view schematically illustrating the sanitary washing device according to the embodiment.
Figure 14:
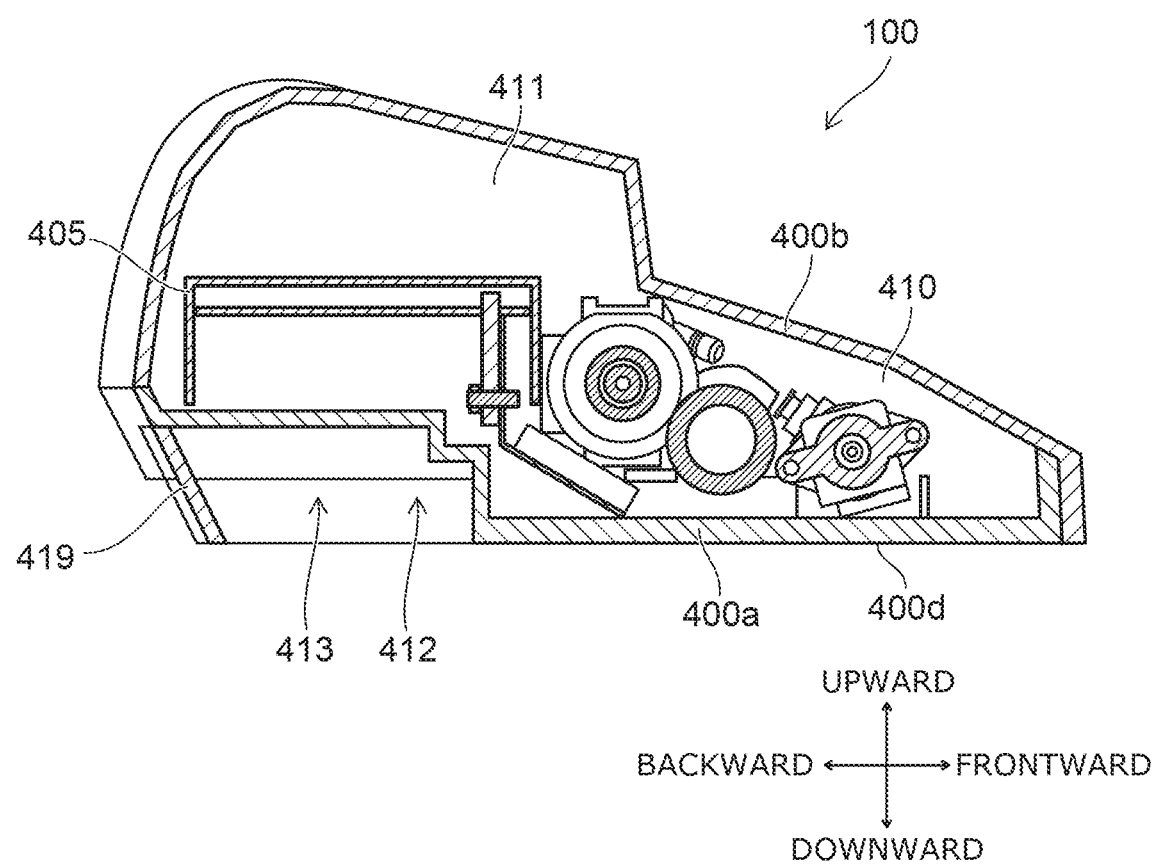
FIG. 14 is a cross-sectional view schematically illustrating the sanitary washing device according to the embodiment.
Figure 15:
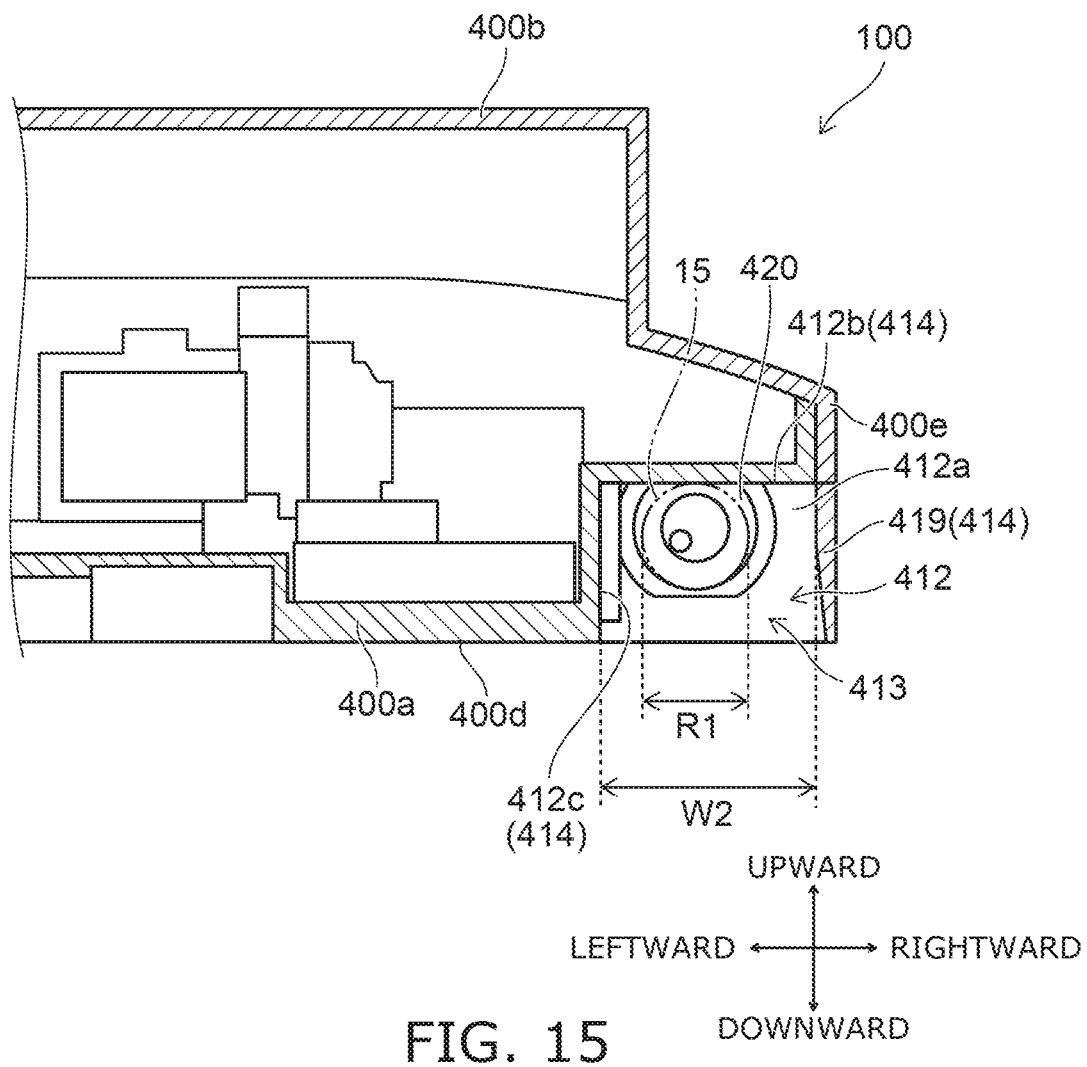
FIG. 15 is a cross-sectional view schematically illustrating the sanitary washing device according to the embodiment.
Figure 16:
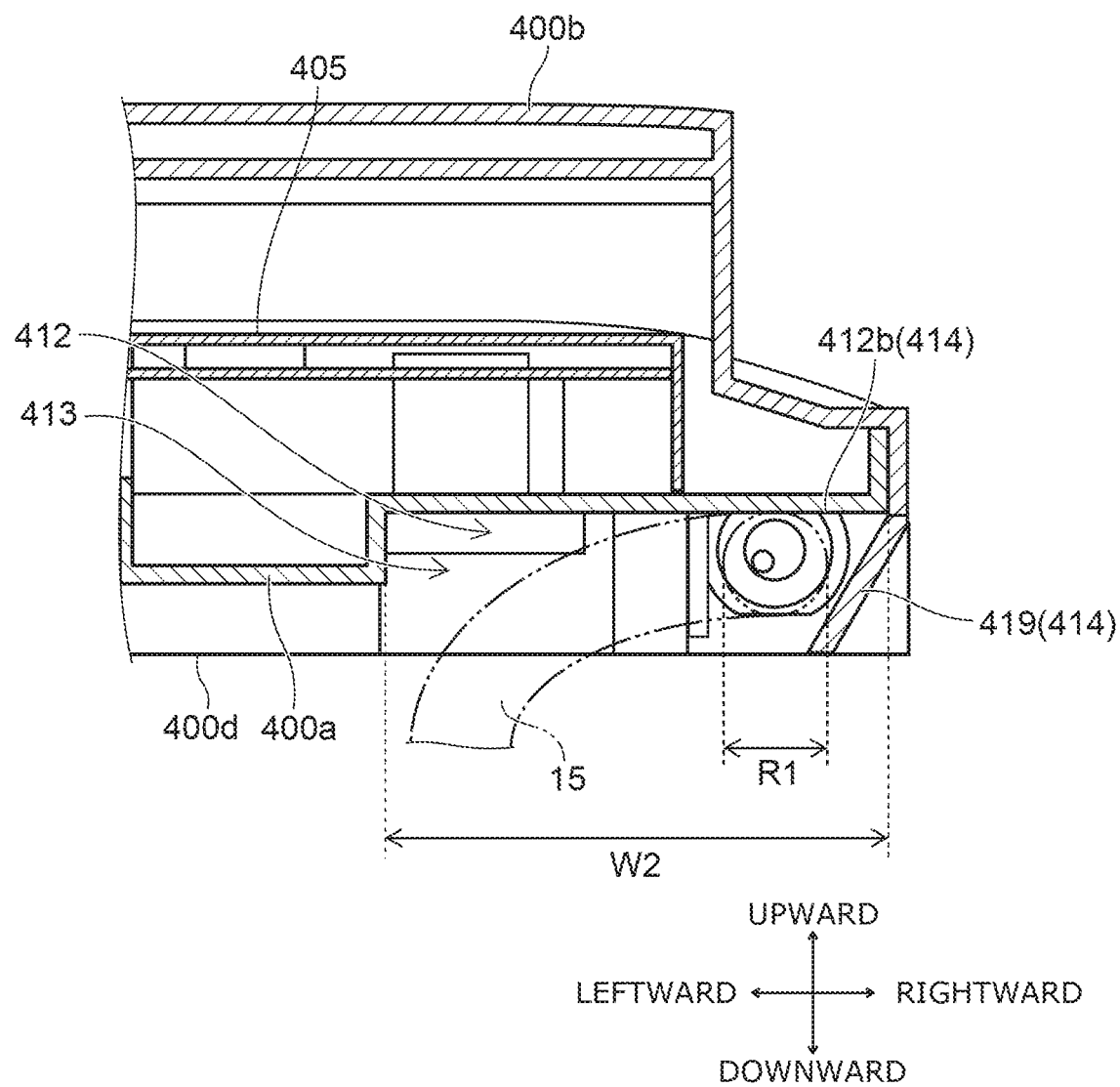
FIG. 16 is a cross-sectional view schematically illustrating the sanitary washing device according to the embodiment.

FIG. 13 is a cross-sectional view along line F1-F2 shown in FIG. 12. FIG. 14 is a cross-sectional view along line G1-G2 shown in FIG. 12. FIG. 15 is a cross-sectional view along line H1-H2 shown in FIG. 12. FIG. 16 is a cross-sectional view along line J1-J2 shown in FIG. 12.

As illustrated in FIG. 12 to FIG. 16, the casing 400 includes a concave portion 412 recessed upward from a bottom surface 400d. The bottom surface 400d of the casing 400 is a surface positioned at the lower end of the case plate 400a. For example, the bottom surface 400d of the casing 400 is a surface opposing the upper surface of the toilet 800 in the state in which the sanitary washing device 100 is mounted to the toilet 800.

As illustrated in FIG. 13, the concave portion 412 has an upper surface 412b, and a side surface 412a facing backward or sideward. The upper surface 412b of the concave portion 412 is a surface positioned at the upper end of the concave portion 412. The upper surface 412b of the concave portion 412 is positioned higher than the bottom surface 400d of the casing 400. The depth of the concave portion 412 is greater than an outer diameter R1 of the water supply hose 15. In other words, the distance in the vertical direction between the upper surface 412b of the concave portion 412 and the bottom surface 400d of the casing 400 is greater than the outer diameter R1 of the water supply hose 15.

The water supply connection part 420 is provided on the side surface 412a of the concave portion 412. The water supply connection part 420 is open backward or sideward. That is, the water supply connection part 420 is open in the horizontal direction. In the example, the water supply connection part 420 is open backward and is provided on the side surface 412a of the concave portion 412 facing backward. The water supply hose 15 is directly connected to the water supply connection part 420 in the horizontal direction, and the water supply connection part 420 is open in the horizontal direction.

Thus, by providing the concave portion 412 recessed upward from the bottom surface 400d in the casing 400 and by providing the water supply connection part 420 at the side surface 412a of the concave portion 412 facing backward or sideward, the water supply hose 15 can extend backward and/or sideward from the water supply connection part 420. Thereby, when the sanitary washing device 100 is detached from the toilet 800 and temporarily placed on the floor or the toilet 800, the kinking of the water supply hose 15 sandwiched between the floor and the casing 400 or between the toilet 800 and the casing 400 can be suppressed. Also, the temporary placement is easy because the tilt of the casing 400 due to the reaction force of the water supply hose 15 can be suppressed. By using the water supply hose 15 that is flexible, the water supply hose 15 can be arranged while suppressing the kinking when inserting the water supply hose 15 into the through-hole 810 provided in the toilet 800 even if the position of the through-hole 810 is shifted from the water supply connection part 420. Also, the sanitary washing device 100 easily can be more compact in the vertical direction because the water supply hose 15 can extend backward and/or sideward from the water supply connection part 420.

Because the water supply hose 15 is directly connected to the water supply connection part 420 in the horizontal direction and the water supply connection part 420 is open in the horizontal direction, it is unnecessary to provide a water supply pipe member connecting the water supply hose 15 and the water supply connection part 420. Thereby, the number of parts can be reduced, and the cost can be reduced.

When the sanitary washing device 100 is mounted on a toilet that has the through-hole 810 passing through in the vertical direction, the water supply hose 15 that extends from the water supply connection part 420 in the horizontal direction is inserted into the through-hole 810 by being bent toward the vertical direction. Therefore, in the embodiment, the casing 400 includes a hose container 413 in which a portion of the water supply hose 15 can be stored by bending. When the hose container 413 is mounted on the toilet 800 having the through-hole 810, there is space in which the water supply hose 15 can be bent while storing the water supply hose 15 within the outer perimeter of the casing 400.

Thus, because the casing 400 includes the hose container 413 that can store the water supply hose 15 by bending a portion of the water supply hose 15, the water supply hose 15 can be inserted easily into the through-hole 810 regardless of the position of the through-hole 810 provided in the toilet 800. The through-holes 810 of diverse toilets 800 can be accommodated thereby. The height of the sanitary washing device 100 can be reduced by connecting the water supply hose 15 to the water supply connection part 420 in the horizontal direction. By providing the hose container 413, the kinking of the water supply hose 15 sandwiched between the floor and the casing 400 or between the toilet 800 and the casing 400 can be suppressed when the sanitary washing device 100 is detached from the toilet 800 and temporarily placed on the floor or the toilet 800.

In the example, the hose container 413 is the concave portion 412. That is, the hose container 413 is provided outside the case plate 400a. In the embodiment, the hose container 413 may be provided inside the case plate 400a. As recited above, the water supply connection part 420 is provided on the side surface 412a of the concave portion 412.

Thus, by using the concave portion 412 recessed upward from the bottom surface 400d of the casing 400 as the hose container 413 and by providing the water supply connection part 420 at the side surface 412a of the concave portion 412 facing backward or sideward, it is unnecessary to connect the water supply hose 15 to the water supply connection part 420 inside the casing 400; therefore, the water supply hose 15 can be connected to the water supply connection part 420 more easily.

As illustrated in FIG. 12, the concave portion 412 is provided at the side portion of the casing 400. More specifically, the concave portion 412 is provided at a position not overlapping a lateral-direction center CL2 of the casing 400. For example, when the casing 400 is divided uniformly into three regions in the lateral direction, the concave portion 412 is provided in a region (i.e., a region at the side portion) that does not include the lateral-direction center CL2 of the casing 400.

Thus, by providing the concave portion 412 at a position not overlapping the lateral-direction center CL2 of the casing 400, the interference between the concave portion 412 and parts such as the nozzle 473, etc., stored at the lateral-direction center CL2 vicinity inside the casing 400 can be suppressed. Thereby, sufficient space for arranging the water supply hose 15 can be provided in the concave portion 412.

As illustrated in FIG. 13, a length D2 of the concave portion 412 in the direction in which the water supply connection part 420 faces the water supply hose 15 is greater than twice as much as the outer diameter R1 of the water supply hose 15. In the example, the direction in which the water supply connection part 420 faces is backward. In the example, the length D2 is the distance between the front end and the back end of the concave portion 412. In the embodiment, the direction in which the water supply connection part 420 faces may be sideward (e.g., rightward). In such a case, the length D2 is the distance between the left end and the right end of the concave portion 412.

Thus, by setting the length D2 of the concave portion 412 in the direction in which the water supply connection part 420 faces the water supply hose 15 to be greater than twice as much as the outer diameter R1 of the water supply hose 15, sufficient space for arranging the water supply hose 15 can be provided even when the water supply hose 15 is arranged by bending.

As illustrated in FIG. 15 and FIG. 16, a width W2 of the concave portion 412 increases along the direction in which the water supply connection part 420 faces the water supply hose 15. In the example, the direction in which the water supply connection part 420 faces is backward. In the example, the width W2 is the length in the lateral direction of the concave portion 412. That is, in the example, the length in the lateral direction of the front end of the concave portion 412 is less than the length in the lateral direction of the back end of the concave portion 412. More specifically, in the example, the concave portion 412 includes a front portion that has a short length in the lateral direction, and a back portion that is provided backward of the front portion and has a larger length in the lateral direction than the front portion. In the embodiment, the direction in which the water supply connection part 420 faces may be sideward. In such a case, the width W2 is the length in the longitudinal direction of the concave portion 412.

Thus, by setting the width W2 of the concave portion 412 to increase along the direction in which the water supply connection part 420 faces, the concave portion 412 can be smaller while ensuring sufficient space for arranging the water supply hose 15. The space where other parts can be disposed inside the casing 400 can be increased thereby. Also, the casing 400 can be more compact.

As illustrated in FIG. 12, the water supply connection part 420 is provided further frontward than a longitudinal-direction center CL3 of the casing 400. More specifically, the front end of the water supply connection part 420 is positioned further frontward than the longitudinal-direction center CL3 of the casing 400. Also, the back end of the water supply connection part 420 is positioned further frontward than the longitudinal-direction center CL3 of the casing 400. The back end of the water supply connection part 420 may be positioned further backward than the longitudinal-direction center CL3 of the casing 400. That is, the water supply connection part 420 may be provided at a position overlapping the longitudinal-direction center CL3 of the casing 400.

Thus, by providing the water supply connection part 420 further frontward than the longitudinal-direction center CL3 of the casing 400, sufficient space for bending the water supply hose 15 can be ensured while suppressing the kinking of the water supply hose 15. Thereby, the water supply hose 15 can be arranged easily with respect to the through-hole 810 of the toilet 800 disposed further backward than the water supply connection part 420.

As illustrated in FIG. 12 and FIG. 15, the water supply connection part 420 is provided at a position next to a side end 400e of the casing 400. The distance in the lateral direction between the water supply connection part 420 and the side end 400e of the casing 400 is, for example, 20 mm or less.

Thus, by providing the water supply connection part 420 at a position next to the side end 400e of the casing 400, the hose container 413 can be more proximate to the side end 400e of the casing 400. Thereby, when mounted on the toilet 800 that has no through-hole 810, the hose container 413 can be smaller while ensuring sufficient space for arranging the water supply hose 15. The space where other parts can be disposed inside the casing 400 can be increased thereby. Also, the casing 400 can be more compact.

When the sanitary washing device 100 is mounted to the toilet 800 that has the through-hole 810, for example, the water supply connection part 420 is provided at a position separated from the position where the through-hole 810 is open in the state in which the sanitary washing device 100 is mounted to the toilet 800. More specifically, for example, the water supply connection part 420 is provided at a position not overlapping the through-hole 810 in the vertical direction in the state in which the sanitary washing device 100 is mounted to the toilet 800.

For example, the water supply connection part 420 is provided further frontward than the through-hole 810 in the state in which the sanitary washing device 100 is mounted to the toilet 800. For example, the water supply connection part 420 may be provided further sideward (toward the side end 400e side) than the through-hole 810 in the state in which the sanitary washing device 100 is mounted to the toilet 800. The distance between the water supply connection part 420 and the through-hole 810 is, for example, greater than twice as much as the outer diameter R1 of the water supply hose 15.

As illustrated in FIG. 12 to FIG. 16, a cover member 419 is provided along a sideward direction of the concave portion 412. The cover member 419 is provided detachably. In the example, the cover member 419 covers the back and the side of the concave portion 412. For example, the cover member 419 may cover only the side of the concave portion 412.

For example, when the through-hole 810 for inserting the water supply hose 15 is not provided in the toilet 800, the water supply hose 15 can be arranged sideward of the concave portion 412 by detaching the cover member 419. On the other hand, for example, when the through-hole 810 for inserting the water supply hose 15 is provided in the toilet 800, the side of the concave portion 412 can be concealed by mounting the cover member 419. Thereby, the water supply connection part 420 is not viewable by the user, and the designability can be improved.

By detaching the cover member 419, the hose container 413 (the concave portion 412) is open in at least one of the backward direction and the sideward direction. That is, the casing 400 is not provided in the direction in which the water supply connection part 420 faces.

Thus, by opening the hose container 413 toward at least one of backward or sideward, the water supply hose 15 can extend toward at least one of backward or sideward of the hose container 413. Thereby, even when the through-hole 810 is not provided in the toilet 800, the water supply hose 15 can be arranged while suppressing the kinking of the water supply hose 15. That is, the sanitary washing device 100 can be mounted on either the toilet 800 that has the through-hole 810 or the toilet 800 that has no through-hole 810.

Because the water supply hose 15 can extend toward at least one of backward or sideward of the concave portion 412, the concave portion 412 can be smaller while ensuring sufficient space for arranging the water supply hose 15. The space where other parts can be disposed inside the casing 400 can be increased thereby. Also, the casing 400 can be more compact.

As illustrated in FIG. 12 to FIG. 16, the sanitary washing device 100 further includes a guide part 414 guiding the water supply hose 15 in the regular direction. For example, the guide part 414 guides the water supply hose 15 in the regular direction by restricting movement of the water supply hose 15 in the upward direction and/or the lateral direction.

Thus, by providing the guide part 414 that guides the water supply hose 15 in the regular direction, the kinking of the flexible water supply hose 15 can be suppressed in the state of being connected to the water supply connection part 420.

As illustrated in FIG. 13 and FIG. 15, for example, the guide part 414 includes the upper surface 412b of the concave portion 412. In other words, for example, the upper surface 412b of the concave portion 412 functions as the guide part 414.

Thus, because the upper surface 412b of the concave portion 412 guides the water supply hose 15, the kinking of the water supply hose 15 can be suppressed by reducing the extension of the water supply hose 15 upward.

As illustrated in FIG. 15, the guide part 414 includes the cover member 419 and a side surface 412c of the concave portion 412 opposing the cover member 419. In other words, for example, the cover member 419 and the side surface 412c of the concave portion 412 function as the guide part 414.

Thus, by guiding the water supply hose 15 by providing the cover member 419 provided sideward of the concave portion 412 and the side surface 412c of the concave portion 412 opposing the cover member 419, the water supply hose 15 can be connected easily to the water supply connection part 420 even when the water supply hose 15 is connected by bending toward the lateral direction.

As illustrated in FIG. 13, FIG. 14, and FIG. 16, the controller 405 is disposed inside the casing 400 above the concave portion 412. More specifically, the lower end of the controller 405 is positioned higher than the upper surface 412b of the concave portion 412. Also, the controller 405 is provided at a position overlapping the concave portion 412 in the vertical direction.

Thus, by disposing the controller 405 above the concave portion 412 inside the casing 400, for example, the controller 405 can be disposed at a position higher than the valve unit 430. Thereby, for example, in the case of water leakage from the valve unit 430, the contact with the controller 405 of water leaking from the valve unit 430 can be suppressed.

According to the embodiments as described above, it is possible to provide the sanitary washing device 100 that can prevent damage of the valve unit 430 due to freezing, even when the valve unit 430 is made of a hard material.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. For example, the shape, the dimension, the material, the disposition, the installation feature or the like of the components included in the sanitary washing apparatus 100 are not limited to the illustration and can be appropriately modified.

The components included in the embodiments described above can be combined within the extent of technical feasibility, and any combined components also are included in the scope of the invention to the extent that the feature of the invention is included.

What is claimed is:

1. A sanitary washing device, comprising:
a nozzle configured to discharge water toward an anogenital region of a human body;

a valve unit provided on a pipe line between a water supply source and the nozzle, the valve unit including an electromagnetic valve;

a casing storing the nozzle and the valve unit; and a toilet seat pivotally supported to be rotatable with respect to the casing, a heater being provided inside the toilet seat, at least a portion of the valve unit being disposed below the heater of the toilet seat.

2. The device according to claim 1, wherein
a length in a longitudinal direction of the valve unit and a length in a lateral direction of the valve unit are greater than a length in a vertical direction of the valve unit.

3. The device according to claim 1, wherein
the valve unit is disposed below a back portion of the toilet seat, and
a length in a longitudinal direction of the valve unit is less than a length in a lateral direction of the valve unit.

4. The device according to claim 1, wherein 20% or more of the valve unit is positioned below the toilet seat.

5. The device according to claim 1, further comprising:
a heat exchanger unit provided downstream of the valve unit on the pipe line, the heat exchanger unit being configured to heat water supplied from the water supply source,
the heat exchanger unit being disposed backward of a back end of the heater of the toilet seat.

6. The device according to claim 1, wherein
the casing includes a low portion and a high portion, the low portion being positioned below the toilet seat, the high portion being positioned backward of the low portion, a length in a vertical direction of the high portion being greater than a length in a vertical direction of the low portion,
the valve unit is disposed in the low portion,
an upper surface of the low portion becomes lower from a back toward a front,
an upper end of the valve unit becomes lower from a back toward a front, and
the toilet seat is provided along the upper surface of the low portion in a longitudinal direction.

7. The device according to claim 6, wherein
the upper surface of the low portion becomes lower from a lateral-direction center toward a side,
the upper end of the valve unit becomes lower from a lateral-direction center toward a side, and
the toilet seat is provided along the upper surface of the low portion in a lateral direction.

8. The device according to claim 1, wherein
the valve unit further includes a strainer provided upstream of the electromagnetic valve and a reduced-diameter part positioned between the strainer and the electromagnetic valve,
an inner diameter of the reduced-diameter part is less than an inner diameter of the strainer, and
the reduced-diameter part is disposed below the toilet seat.

9. The device according to claim 8, wherein
the strainer is disposed below the toilet seat.

10. The device according to claim 1, wherein
the electromagnetic valve is disposed below the toilet seat.

11. The device according to claim 2, wherein
the valve unit is disposed below a back portion of the toilet seat, and
the length in the longitudinal direction of the valve unit is less than the length in the lateral direction of the valve unit.

12. The device according to claim 11, wherein 20% or more of the valve unit is positioned below the toilet seat.

13. The device according to claim 12, further comprising:
a heat exchanger unit provided downstream of the valve unit on the pipe line, the heat exchanger unit being configured to heat water supplied from the water supply source,
the heat exchanger unit being disposed backward of a back end of the heater of the toilet seat.

14. The device according to claim 13, wherein
the casing includes a low portion and a high portion, the low portion being positioned below the toilet seat, the high portion being positioned backward of the low portion, a length in the vertical direction of the high portion being greater than a length in the vertical direction of the low portion,
the valve unit is disposed in the low portion,
an upper surface of the low portion becomes lower from a back toward a front,
an upper end of the valve unit becomes lower from a back toward a front, and
the toilet seat is provided along the upper surface of the low portion in the longitudinal direction.

15. The device according to claim 14, wherein
the upper surface of the low portion becomes lower from a lateral-direction center toward a side,
the upper end of the valve unit becomes lower from a lateral-direction center toward a side, and
the toilet seat is provided along the upper surface of the low portion in the lateral direction.

16. The device according to claim 15, wherein
the valve unit further includes a strainer provided upstream of the electromagnetic valve and a reduced-diameter part positioned between the strainer and the electromagnetic valve,
an inner diameter of the reduced-diameter part is less than an inner diameter of the strainer, and
the reduced-diameter part is disposed below the toilet seat.

17. The device according to claim 16, wherein
the strainer is disposed below the toilet seat.

18. The device according to claim 17, wherein
the electromagnetic valve is disposed below the toilet seat.

* * * * *